United States Patent
Shimohara et al.

(10) Patent No.: US 12,252,621 B2
(45) Date of Patent: Mar. 18, 2025

(54) INK SET FOR SECURITY IMAGE RECORDING, SECURITY IMAGE RECORDING METHOD, AND ARTICLE WITH RECORDED SECURITY IMAGE

(71) Applicant: FUJIFILM Corporation, Tokyo (JP)

(72) Inventors: Norihide Shimohara, Kanagawa (JP); Misato Sasada, Kanagawa (JP); Hiromichi Numazawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 295 days.

(21) Appl. No.: 18/060,555

(22) Filed: Nov. 30, 2022

(65) Prior Publication Data

US 2023/0106861 A1    Apr. 6, 2023

Related U.S. Application Data

(63) Continuation of application No. PCT/JP2021/023961, filed on Jun. 24, 2021.

(30) Foreign Application Priority Data

Jul. 15, 2020   (JP) ................ 2020-121262

(51) Int. Cl.
| | |
|---|---|
| *B41M 3/14* | (2006.01) |
| *B41M 5/50* | (2006.01) |
| *C09D 11/101* | (2014.01) |
| *C09D 11/107* | (2014.01) |
| *C09D 11/328* | (2014.01) |
| *C09D 11/50* | (2014.01) |

(52) U.S. Cl.
CPC .............. *C09D 11/107* (2013.01); *B41M 3/14* (2013.01); *B41M 5/50* (2013.01); *C09D 11/328* (2013.01); *C09D 11/50* (2013.01)

(58) Field of Classification Search
CPC ......... B42D 25/382; B41M 3/14; B41M 5/50; C09D 11/101; C09D 11/107; C09D 11/322; C09D 11/328; C09D 11/40; C09D 11/50

See application file for complete search history.

(56) References Cited

U.S. PATENT DOCUMENTS

| | | | |
|---|---|---|---|
| 10,953,668 B2 | 3/2021 | Hirai et al. | |
| 2007/0082963 A1 | 4/2007 | Bhatt | |
| 2007/0263057 A1 | 11/2007 | Eiseman et al. | |
| 2009/0115826 A1 | 5/2009 | Sadohara | |
| 2011/0070407 A1 | 3/2011 | Kato et al. | |
| 2011/0278461 A1* | 11/2011 | Kobayashi | C09D 5/32 427/256 |
| 2018/0016450 A1 | 1/2018 | Okada et al. | |
| 2020/0115556 A1 | 4/2020 | Sakamoto et al. | |
| 2020/0148907 A1 | 5/2020 | Lazreg et al. | |
| 2020/0172752 A1 | 6/2020 | Okada et al. | |
| 2020/0283586 A1 | 9/2020 | Tsunematsu et al. | |
| 2021/0206175 A1 | 7/2021 | Sasada et al. | |

FOREIGN PATENT DOCUMENTS

| | | | |
|---|---|---|---|
| CN | 109642106 | 4/2019 | |
| CN | 110770310 | 2/2020 | |
| CN | 110831778 | 2/2020 | |
| CN | 111032745 | 4/2020 | |
| EP | 1772497 | 4/2007 | |
| JP | 2004001477 | 1/2004 | |
| JP | 2004142130 | * 5/2004 | ............. B41M 5/00 |
| JP | 2009114323 | 5/2009 | |
| JP | 2009536682 | 10/2009 | |
| JP | 2010222557 | 10/2010 | |
| JP | 2011215202 | 10/2011 | |
| JP | 2016160319 | 9/2016 | |
| JP | 2019001983 | 1/2019 | |
| JP | 2019056111 | 4/2019 | |
| JP | 2019099733 | 6/2019 | |
| WO | 2020066388 | 4/2020 | |

OTHER PUBLICATIONS

"Office Action of Japan Counterpart Application", issued on Oct. 31, 2023, with English translation thereof, p. 1-p. 6.
"Search Report of Europe Counterpart Application", issued on Nov. 8, 2023, p. 1-p. 7.
"International Search Report (Form PCT/ISA/210) of PCT/JP2021/023961," mailed on Aug. 17, 2021, with English translation thereof, pp. 1-6.
"Written Opinion of the International Searching Authority (Form PCT/ISA/237) of PCT/JP2021/023961," mailed on Aug. 17, 2021, with English translation thereof, pp. 1-8.
"Office Action of China Counterpart Application", issued on May 11, 2023, with partial English translation thereof, p. 1-p. 18.
"Office Action of Japan Counterpart Application", issued on Apr. 2, 2024, with English translation thereof, pp. 1-6.

* cited by examiner

*Primary Examiner* — Anh T Vo
(74) *Attorney, Agent, or Firm* — JCIPRNET

(57) ABSTRACT

Provided is an ink set for security image recording comprising an infrared-absorbing ink jet ink which contains a polymerizable compound and an infrared absorbing dye and in which a maximum value of an absorbance in a wavelength range of 750 nm to 1,000 nm is larger than a maximum value of an absorbance in a wavelength range of 400 nm to 750 nm, and color ink jet inks which each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less. Also provided are applications of the ink set.

12 Claims, No Drawings

INK SET FOR SECURITY IMAGE RECORDING, SECURITY IMAGE RECORDING METHOD, AND ARTICLE WITH RECORDED SECURITY IMAGE

CROSS-REFERENCE TO RELATED APPLICATIONS

This application is a continuation application of International Application No. PCT/JP2021/023961, filed Jun. 24, 2021, the disclosure of which is incorporated herein by reference in its entirety. Further, this application claims priority from Japanese Patent Application No. 2020-121262, filed Jul. 15, 2020, the disclosure of which is incorporated herein by reference in its entirety.

BACKGROUND OF THE INVENTION

1. Field of the Invention

The present disclosure relates to an ink set for security image recording, a security image recording method, and an article with a recorded security image.

2. Description of the Related Art

In recent years, an ink jet ink containing a near-infrared absorbing dye has been known.

For example, JP2019-001983A discloses a squarylium dye [A] having a specific structure, as a squarylium dye which has high invisibility, that is, has low absorption in a visible light region (400 nm to 750 nm), has an extremely high near-infrared absorptivity, is excellent in various types of resistance, and is not easily aggregated. For example, in Examples of JP2019-001983A, an ink jet ink containing the squarylium dye [A], a dispersant, an organic solvent, and water is disclosed.

SUMMARY OF THE INVENTION

The ink jet ink containing an infrared absorbing dye is used for, for example, recording a security image (for instance, a security image for the purpose of preventing forgery) that is read by the irradiation with infrared rays.

In some cases, such a security image is required to have infrared readability (properties of being readable in a case where the image is irradiated with infrared rays) and invisibility (that is, properties of being unlikely to be visually recognized).

However, sometimes a security image recorded using only an ink jet ink containing an infrared absorbing dye (that is, a security image consisting of an infrared absorbing image) has insufficient invisibility (that is, sometimes the security image is visually recognized).

An object of one aspect of the present disclosure is to provide an ink set for security image recording and a security image recording method making it possible to record a security image that includes an infrared absorbing image and a color image including an overlap portion where the infrared absorbing image and the color image overlap each other in a plane view and is excellent in infrared readability and invisibility of the infrared absorbing image, and to provide an article with a recorded security image comprising the security image.

Specific means for achieving the above object includes the following aspects.

<1> An ink set for security image recording, comprising an infrared-absorbing ink jet ink which contains a polymerizable compound and an infrared absorbing dye and in which a maximum value of an absorbance in a wavelength range of 750 nm to 1,000 nm is greater than a maximum value of an absorbance in a wavelength range of 400 nm to 750 nm, and color ink jet inks which each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less.

<2> The ink set for security image recording described in <1>, wherein the number of the color ink jet inks is 3 or more, and the 3 or more color ink jet inks include a color ink jet ink Y containing a yellow colorant as the colored colorant, a color ink jet ink M containing at least one colorant selected from the group consisting of a magenta colorant, a red colorant, a violet colorant, and a pink colorant as the colored colorant, and a color ink jet ink C containing at least one colorant selected from the group consisting of a cyan colorant and a blue colorant as the colored colorant.

<3> The ink set for security image recording described in <1> or <2>, in which the colored colorant contained in each of the color ink jet inks is at least one colorant selected from the group consisting of an organic dye and an organic pigment.

<4> The ink set for security image recording described in any one of <1> to <3>, in which the infrared absorbing dye includes a squarylium dye.

<5> The ink set described in <4>, in which the squarylium dye is a squarylium compound represented by Formula (1).

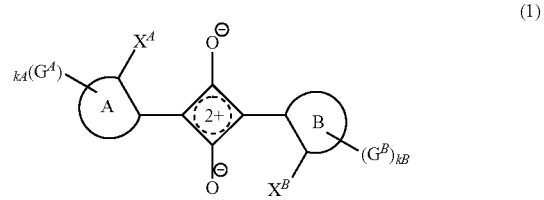

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, and kB represents an integer of 0 to nB. nA represents an integer which is a maximum number of $G^A$'s capable of substituting the ring A, and nB represents an integer which is a maximum number of $G^B$'s capable of substituting the ring B. $X^A$ and $G^A$ or $X^B$ and $G^B$ may be bonded to each other to form a ring, and in a case where there is a plurality of $G^A$'s and a plurality of $G^B$'s, the plurality of $G^A$'s bonded to the ring A may be bonded to each other to form a ring and the plurality of $G^B$'s bonded to the ring B may be bonded to each other to form a ring.

<6> The ink set for security image recording described in any one of <1> to <5>, in which at least one of the polymerizable compound contained in the infrared-absorbing ink jet ink or the polymerizable compound contained in each of the color ink jet inks includes a vinyl monomer having a hetero ring.

<7> The ink set for security image recording described in any one of <1> to <6>, in which the infrared-absorbing ink jet ink contains at least one of a monofunctional radically polymerizable monomer or a bifunctional radically polymerizable monomer, a total content of the monofunctional radically polymerizable monomer and the bifunctional radically polymerizable monomer contained in the infrared-absorbing ink jet ink is 50% by mass or more with respect to a total amount of the infrared-absorbing ink jet ink, each of the color ink jet inks contains at least one of a monofunctional radically polymerizable monomer or a bifunctional radically polymerizable monomer, and a total content of the monofunctional radically polymerizable monomer and the bifunctional radically polymerizable monomer contained in each of the color ink jet inks is 50% by mass or more with respect to a total amount of each of the color ink jet inks.

<8> The ink set for security image recording described in any one of <1> to <7>, in which a mass-based content of a radically polymerizable monomer having 2 or more functional groups in the infrared-absorbing ink jet ink is higher than a mass-based content of a radically polymerizable monomer having 2 or more functional groups in each of the color ink jet inks.

<9> A security image recording method which is a method of recording a security image on a substrate by using the ink set for security image recording described in any one of <1> to <8>, the security image including an infrared absorbing image and a color image having an overlap portion where the infrared absorbing image and the color image overlap each other in a plane view, the method including a step of applying the infrared-absorbing ink jet ink and the color ink jet inks on a substrate by an ink jet method, in an arrangement in which the overlap portion where the infrared absorbing image and the color image overlap each other in a plane view is formed, and a step of irradiating the infrared-absorbing ink jet ink and the color ink jet inks applied on the substrate with an active energy ray to obtain a security image.

<10> The security image recording method described in <9>, in which the infrared absorbing image is at least one of a text image or a code image.

<11> An article with a recorded security image, comprising a substrate, and a security image which is disposed on the substrate and includes an infrared absorbing image and a color image having an overlap portion where the infrared absorbing image and the color image overlap each other in a plane view, in which the infrared absorbing image is a cured substance of an infrared-absorbing ink jet ink, the infrared-absorbing ink jet ink is an infrared-absorbing ink jet ink which contains a polymerizable compound and an infrared absorbing dye and in which a maximum value of an absorbance in a wavelength range of 750 nm to 1,000 nm is higher than a maximum value of an absorbance in a wavelength range of 400 nm to 750 nm, the color image is a cured substance of color ink jet inks, and the color ink jet inks each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less.

<12> The article with a recorded security image described in <11>, in which the infrared absorbing image is at least one of a text image or a code image.

An object of one aspect of the present disclosure, there are provided an ink set for security image recording and a security image recording method making it possible to record a security image that includes an infrared absorbing image and a color image including an overlap portion where the infrared absorbing image and the color image overlap each other in a plane view and is excellent in infrared readability and invisibility of the infrared absorbing image, and an article with a recorded security image comprising the security image.

DESCRIPTION OF THE PREFERRED EMBODIMENTS

In the present disclosure, a range of numerical values described using "to" means a range including the numerical values listed before and after "to" as the lower limit and the upper limit.

In the present disclosure, in a case where there is a plurality of substances in a composition that corresponds to each component of the composition, unless otherwise specified, the amount of each component of the composition means the total amount of the plurality of substances present in the composition.

Regarding the ranges of numerical values described stepwise in the present disclosure, the upper limit or the lower limit described in a certain range of numerical values may be replaced with the upper limit or the lower limit of another range of numerical values described stepwise or replaced with the values shown in Examples.

In the present disclosure, the term "step" includes not only an independent step, but also a step that is not clearly distinguished from other steps as long as the step achieves the intended goal.

In the present disclosure, a combination of preferable aspects is a more preferable aspect.

In the present disclosure, "light" is a concept that includes active energy rays such as α-rays, γ rays, β rays, X-rays, electron beams, ultraviolet rays, and visible rays.

In the present disclosure, "(meth)acrylate" is a concept that includes both the acrylate and methacrylate, "(meth)acryloyl group" is a concept that includes both the acryloyl group and methacryloyl group, and "(meth)acrylic acid" is a concept that includes both the acrylic acid and methacrylic acid.

In the present disclosure, "image" means a general film formed by the application of an ink on a substrate, and "recording of an image" and "image recording" both mean the formation of a film by the application of an ink on a substrate. The concept of "image" also includes a solid image.

[Ink Set for Security Image Recording]

The ink set for security image recording (hereinafter, also simply called "ink set") of the present disclosure comprises an infrared-absorbing ink jet ink (hereinafter, also called "IR ink") which contains a polymerizable compound and an infrared absorbing dye and in which a maximum value of an absorbance in a wavelength range of 750 nm to 1,000 nm is greater than a maximum value of an absorbance in a wavelength range of 400 nm to 750 nm, and color ink jet inks (hereinafter, also called "color inks") which each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.1 or less.

With the ink set of the present disclosure, it is possible to record a security image which includes an infrared absorbing image and a color image including an overlap portion where the infrared absorbing image and the color image overlap each other in a plane view, and is excellent in infrared readability and invisibility of the infrared absorbing image.

The reason why such an effect is obtained is presumed as follows.

In the ink set of the present disclosure, the maximum value of the absorbance of the IR ink in a wavelength range of 750 nm to 1,000 nm (that is, Abs (NIR)) is higher than the maximum value of the absorbance of the IR ink in a wavelength range of 400 nm to 750 nm (hereinafter, also called Abs (VIS)). That is, the IR ink in the ink set of the present disclosure satisfies an absorbance ratio [Abs (NIR)/Abs (VIS)] of more than 1.

Accordingly, the infrared readability of the infrared absorbing image that is based on the effect described above is ensured.

However, as described above, sometimes a security image recorded using only an ink jet ink containing an infrared absorbing dye (that is, a security image consisting of an infrared absorbing image) has insufficient invisibility (that is, sometimes the security image is visually recognized).

As a solution to the problem of invisibility, a method is considered which is a method of recording a security image including an infrared absorbing image derived from the IR ink and a color image derived from color inks by using an ink set comprising the IR ink containing an infrared absorbing dye and the color inks containing colored colorants. In the security image of this aspect, the infrared absorbing image and the color image are recorded, such that these images include an overlap portion where the images overlap each other in a plane view. Accordingly, an effect is obtained which makes it difficult for the color of the infrared absorbing image to be noticed by the color of the color image in the overlap portion. As a result, the invisibility of the infrared absorbing image in the overlap portion is ensured.

However, through studies, the inventors of the present invention and the like have revealed that in a case where a security image including an infrared absorbing image and a color image is irradiated with infrared rays to read the infrared absorbing image in the security image, not only the infrared absorbing image but also the color image is also read, which sometimes leads to a case where the infrared readability of the infrared absorbing image deteriorates. This phenomenon particularly markedly occurs in a case where a color ink (for example, a black ink containing carbon black) having high absorption in an infrared region (for example, Abs (NIR) that will be described later) is used.

As means for solving the problem of infrared readability, in the ink set of the present disclosure, a ratio (hereinafter, also called "Abs (NIR) ratio") of Abs (NIR) of the color ink to the maximum value of the absorbance of the IR ink in a wavelength range of 750 nm to 1,000 nm (hereinafter, also called "Abs (NIR)") is 0.1 or less.

The Abs (NIR) ratio is a ratio represented by the following equation.

Abs (NIR) ratio=Abs (NIR) of color ink/Abs (NIR) of IR ink=maximum value of absorbance of color ink in wavelength range of 750 nm to 1,000 nm/maximum value of absorbance of IR ink in wavelength range of 750 nm to 1,000 nm In the present disclosure, the absorbance of each ink means a value measured for a diluted solution, which is obtained by diluting each ink with dimethyl sulfoxide, at 25° C. by using an ultraviolet-visible-near infrared spectrophotometer (for example, "V-570" manufactured by JASCO Corporation).

In the ink set of the present disclosure, because the Abs (NIR) ratio is 0.1 or less, Abs (NIR) of the color ink is relatively small compared to Abs (NIR) of the IR ink, which thus suppresses the phenomenon where the infrared readability deteriorates in a case where the security image is irradiated with infrared rays to read the infrared absorbing image in the security image (specifically, the phenomenon where not only the infrared absorbing image but also the color image is read).

It is considered that for the above reason, with the ink set of the present disclosure, it may be possible to record a security image which includes an infrared absorbing image and a color image including an overlap portion where the infrared absorbing image and the color image overlap each other in a plane view, and is excellent in infrared readability and invisibility of the infrared absorbing image.

Both the IR ink and color ink in the ink set of the present disclosure contain a polymerizable compound. That is, both the IR ink and color ink have curing properties (that is, the properties of being cured by the polymerization of the polymerizable compound). Therefore, with the ink set of the present disclosure, each of the infrared absorbing image derived from the IR ink and the color image derived from the color ink can be recorded as a cured film. As a result, even in a case where the security image is rubbed, the infrared readability of the infrared absorbing image in the security image is ensured (that is, the infrared readability of the security image after rub is ensured).

The ink set of the present disclosure may comprise only one IR ink or two or more IR inks.

The ink set of the present disclosure may comprise only one color ink or two or more color inks.

It is preferable that the color ink in the ink set of the present disclosure includes at least one color ink selected from the group consisting of a color ink jet ink Y containing a yellow colorant as a colored colorant (hereinafter, also called "color ink Y"), a color ink jet ink M containing at least one colorant selected from the group consisting of a magenta colorant, a red colorant, a violet colorant, and a pink colorant as a colored colorant (hereinafter, also called "color ink M"), and a color ink jet ink C containing at least one colorant selected from the group consisting of a cyan colorant and a blue colorant as a colored colorant (hereinafter, also called "color ink C").

In such a preferred aspect, the yellow colorant, the magenta colorant, the red colorant, the violet colorant, the pink colorant, the cyan colorant, and the blue colorant are preferably a yellow pigment, a magenta pigment, a red pigment, a violet pigment, a pink pigment, a cyan pigment, and a blue pigment, respectively.

One of the preferred aspects of the ink set of the present disclosure is an aspect in which the ink set comprises 3 or more color inks, and the 3 or more color inks include the color ink Y, the color ink M, and the color ink C.

According to the above aspect, it is possible to record a security image including a full-color image formed of the color ink Y, the color ink M, and the color ink C and an infrared absorbing image.

The ink set according to the above aspect does not necessarily include a black ink containing a black colorant. Even in a case where the ink set does not include a black ink, by applying 3 colors of the color ink Y, the color ink M, and the color ink C on a substrate in layers, it is possible to record a black image (so-called a composite black image).

The color ink in the ink set according to the above aspect may include other color ink jet inks in addition to the color ink Y, the color ink M, and the color ink C.

The number of types of color inks in the ink set according to the above aspect is preferably 3 to 6.

<IR Ink>

The ink set of the present disclosure comprises at least one IR ink (that is, an infrared-absorbing ink jet ink which contains a polymerizable compound and an infrared absorbing dye and in which a maximum value of an absorbance in a wavelength range of 750 nm to 1,000 nm is greater than a maximum value of an absorbance in a wavelength range of 400 nm to 750 nm).

(Absorbance Ratio [Abs (NIR)/Abs (VIS)])

The maximum value of an absorbance of the IR ink in a wavelength range of 750 nm to 1,000 nm (Abs (NIR)) is greater than the maximum value of an absorbance of the IR ink in a wavelength range of 400 nm to 750 nm (Abs (VIS)). In other words, as described above, in the IR ink, the absorbance ratio [Abs (NIR)/Abs (VIS)] is more than 1. Therefore, the infrared readability of the infrared absorbing image is ensured.

From the viewpoint of further improving the infrared readability of the infrared absorbing image, the absorbance ratio [Abs (NIR)/Abs (VIS)] in the IR ink is preferably 3 or more, and more preferably 5 or more.

(Infrared Absorbing Dye)

The IR ink contains at least one infrared absorbing dye.

Examples of the infrared absorbing dye include a cyanine dye, a naphthalocyanine dye, a carbonium dye, a methine dye, a pyrylium dye, a nickel dithiolene complex, a squarylium dye, a quinoneimine dye, a diimmonium dye, an azo dye, a metal complex salt azo dye, a naphthoquinone dye, an anthraquinone dye, a metal thiolate complex, and the like.

More specifically, examples of the infrared absorbing dye include;
 the cyanine dyes described in JP1983-125246A (JP-S58-125246A), JP1984-84356A (JP-S59-84356A), JP1984-202829A (JP-S59-202829A), JP1985-78787A (JP-H60-78787A), UK Patent No. 434,875, and the like;
 the squarylium dyes described in JP1983-112792A (JP-S58-112792A), JP2019-001983A, and the like;
 the methine dyes described in JP1983-173696A (JP-S58-173696A), JP1983-181690A (JP-S58-181690A), JP1983-194595A (JP-S58-194595A), and the like;
 the naphthoquinone dyes described in JP1983-112793A (JP-S58-112793A), JP1983-224793A (JP-S58-224793A), JP1984-48187A (JP-S59-48187A), JP1984-73996A (JP-S59-73996A), JP1985-52940A (JP-S60-52940A), JP1985-63744A (JP-S60-63744A), and the like;
 the cyanine dyes described in UK Patent No. 434,875; and the like.

The infrared absorbing dye may be an infrared absorbing dye or an infrared absorbing pigment.

As the infrared absorbing dye, from the viewpoint of excellent light fastness, an infrared absorbing pigment is preferable.

From the viewpoint of light fastness, the infrared absorbing dye preferably includes at least one of a cyanine dye or a squarylium dye, and more preferably includes a squarylium dye.

According to these preferred aspects, it is possible to more effectively suppress the deterioration of the infrared absorbing image in a case where the article with a recorded image is displayed outdoor and to more effectively suppress the deterioration of the IR ink or the infrared absorbing image in a case where the IR ink applied on a substrate is irradiated with an active energy ray to obtain an infrared absorbing image.

As the squarylium dye, a compound represented by Formula (1) is preferable.

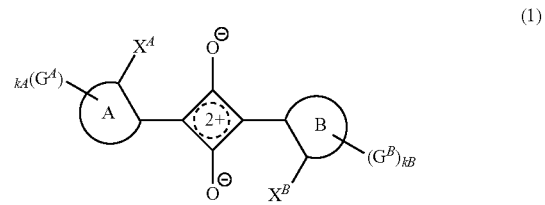

In Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, and kB represents an integer of 0 to nB. nA represents an integer which is a maximum number of $G^A$'s capable of substituting the ring A, and nB represents an integer which is a maximum number of $G^B$'s capable of substituting the ring B. $X^A$ and $G^A$ or $X^B$ and $G^B$ may be bonded to each other to form a ring, and in a case where there is a plurality of $G^A$'s and a plurality of $G^B$'s, the plurality of $G^A$'s bonded to the ring A may be bonded to each other to form a ring and the plurality of $G^B$'s bonded to the ring B may be bonded to each other to form a ring.

$G^A$ and $G^B$ each independently represent a monovalent substituent.

Examples of the monovalent substituent include a halogen atom, a cyano group, a nitro group, an alkyl group, an alkenyl group, an alkynyl group, an aryl group, a heteroaryl group, an aralkyl group, $-OR^{10}$, $-COR^{11}$, $-COOR^{12}$, $-OCOR^{13}$, $-NR^{14}R^{15}$, $-NHCOR^{16}$, $-CONR^{17}R^{18}$, $-NHCONR^{19}R^{20}$, $-NHCOOR^{21}$, $-SR^{22}$, $-SO_2R^{23}$, $-SO_2OR^{24}$, $-NHSO_2R^{25}$, and $SO_2NR^{26}R^{27}$.

$R^{10}$ to $R^{27}$ each independently represent a hydrogen atom, an aliphatic group, an aromatic group, or a heterocyclic group.

In a case where $R^{12}$ of $-COOR^{12}$ is a hydrogen atom (that is, a carboxy group), the hydrogen atom may be dissociated (that is, a carbonate group) or $-COOR^{12}$ may be in a state of salt. In a case where $R^{24}$ of $-SO_2OR^{24}$ is a hydrogen atom (that is, a sulfo group), the hydrogen atom may be dissociated (that is, a sulfonate group) or $-SO_2OR^{24}$ may be in a state of salt.

Examples of the halogen atom include a fluorine atom, a chlorine atom, a bromine atom, and an iodine atom.

The number of carbon atoms in the alkyl group is preferably 1 to 20, more preferably 1 to 15, and even more preferably 1 to 8. The alkyl group may be linear, branched, or cyclic, and is preferably linear or branched.

The number of carbon atoms in the alkenyl group is preferably 2 to 20, more preferably 2 to 12, and particularly preferably 2 to 8. The alkenyl group may be linear, branched, or cyclic, and is preferably linear or branched.

The number of carbon atoms in the alkynyl group is preferably 2 to 40, more preferably 2 to 30, and particularly preferably 2 to 25. The alkynyl group may be linear, branched, or cyclic, and is preferably linear or branched.

The number of carbon atoms in the aryl group is preferably 6 to 30, more preferably 6 to 20, and even more preferably 6 to 12.

The alkyl moiety of the aralkyl group is the same as the aforementioned alkyl group. The aryl moiety of the aralkyl group is the same as the aforementioned aryl group. The number of carbon atoms in the aralkyl group is preferably 7 to 40, more preferably 7 to 30, and even more preferably 7 to 25.

The heteroaryl group is preferably a monocyclic ring or a fused ring, more preferably a monocyclic ring or a fused ring composed of 2 to 8 rings fused together, and even more preferably a monocyclic ring or a fused ring composed of 2 to 4 rings fused together. The number of heteroatoms configuring the ring of the heteroaryl group is preferably 1 to 3. The heteroatom configuring the ring of the heteroaryl group is preferably a nitrogen atom, an oxygen atom, or a sulfur atom. The heteroaryl group is preferably a 5-membered ring or a 6-membered ring. The number of carbon atoms configuring the ring of the heteroaryl group is preferably 3 to 30, more preferably 3 to 18, and even more preferably 3 to 12. Examples of the heteroaryl group include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazole ring, a benzoquinoline ring, and a thiadiazole ring.

The alkyl group, the alkenyl group, the alkynyl group, the aralkyl group, the aryl group, and the heteroaryl group may have a substituent or may be unsubstituted.

Examples of the substituent include the substituents described in paragraph "0030" of JP2018-154672A. As the substituent, substituents are preferable which are selected from the group consisting of an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxy group. Among these, substituents are more preferable which are selected from the group consisting of an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, and a carboxy group.

"Number of carbon atoms" in a substituent means "total number of carbon atoms" in the substituent.

For details of each substituent, the substituents described in paragraphs "0031" to "0035" of JP2018-154672A can be referred to.

$X^A$ and $X^B$ each independently represent a monovalent substituent.

The substituent represented by $X^A$ and $X^B$ is preferably a group having active hydrogen, more preferably —OH, —SH, —COOH, —SO$_3$H, —NR$^{X1}$R$^{X2}$, —NHCOR$^{X1}$, —CONR$^{X1}$R$^{X2}$, —NHCONR$^{X1}$R$^{X2}$, —NHCOOR$^{X1}$, —NHSO$_2$R$^{X1}$, —B(OH)$_2$, or PO(OH)$_2$, and even more preferably —OH, —SH, or NR$^{X1}$R$^{X2}$.

$R^{X1}$ and $R^{X2}$ each independently represent a hydrogen atom or a monovalent substituent. Examples of the substituent include an alkyl group, an alkenyl group, an alkynyl group, an aryl group, and a heteroaryl group. Among these, an alkyl group is preferable. The alkyl group is preferably linear or branched. Details of the alkyl group, the alkenyl group, the alkynyl group, the aryl group, and the heteroaryl group are the same as the ranges described above regarding $G^A$ and $G^B$.

The ring A and the ring B each independently represent an aromatic ring or a heteroaromatic ring.

The aromatic ring and the heteroaromatic ring may be a monocyclic ring or a fused ring.

Specific examples of the aromatic ring and the heteroaromatic ring include a benzene ring, a naphthalene ring, a pentalene ring, an indene ring, an azulene ring, a heptalene ring, an indecene ring, a perylene ring, a pentacene ring, an acenaphthalene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolidine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, and a phenazine ring. Among these, a benzene ring or a naphthalene ring is preferable.

The aromatic ring may be unsubstituted or may have a substituent. Examples of the substituent include the substituents described above regarding $G^A$ and $G^B$.

$X^A$ and $G^A$ or $X^B$ and $G^B$ may be bonded to each other to form a ring. In a case where there is a plurality of $G^A$'s and a plurality of $G^B$'s, $G^A$'s may be bonded to each other to form a ring, and $G^B$'s may be bonded to each other to form a ring.

The ring is preferably a 5-membered ring or a 6-membered ring. The ring may be a monocyclic ring or a heterocyclic ring.

In a case where $X^A$ and $G^A$, $X^B$ and $G^B$, $G^A$'s, or $G^B$'s are bonded to each other to form a ring, these may be directly bonded to each other to form a ring or bonded to each other via a divalent linking group selected from the group consisting of an alkylene group, —CO—, —O—, —NH—, —BR—, and a combination of these to form a ring. It is preferable that $X^A$ and $G^A$, $X^B$ and $G^B$, $G^A$'s, or $G^B$'s be bonded to each other via —BR— to form a ring.

R represents a hydrogen atom or a monovalent substituent. Examples of the substituent include the substituents described above regarding $G^A$ and $G^B$. As the substituent, an alkyl group or an aryl group is preferable.

kA represents an integer of 0 to nA, kB represents an integer of 0 to nB, nA represents an integer which is the maximum number of substituents capable of substituting the ring A, and nB represents an integer which is the maximum number of substituents capable of substituting the ring B.

kA and kB preferably each independently represent 0 to 4, more preferably each independently represent 0 to 2, and particularly preferably each independently represent 0 or 1. It is preferable that a case where kA and kB simultaneously represent 0 (zero) be ruled out.

From the viewpoint of light fastness, among the squarylium compounds represented by Formula (1), a compound represented by Formula (2) is preferable.

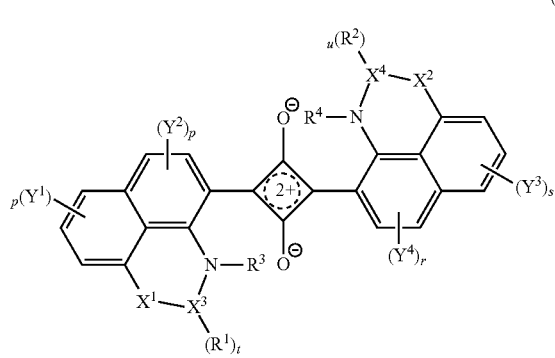

(2)

In Formula (2), $R^1$ and $R^2$ each independently represent a monovalent substituent, and $R^3$ and $R^4$ each independently represent a hydrogen atom or an alkyl group.

$X^1$ and $X^2$ each independently represent an oxygen atom or —N($R^5$)—, and $X^3$ and $X^4$ each independently represent a carbon atom or a boron atom.

t represents 1 in a case where $X^3$ represent a boron atom, and represents 2 in a case where $X^3$ represents a carbon atom. In a case where $X^3$ represents a carbon atom and t is 2, two $R^1$'s may be bonded to each other to form a ring.

u represents 1 in a case where $X^4$ represent a boron atom, and represents 2 in a case where $X^4$ represents a carbon atom. In a case where $X^4$ represents a carbon atom and u is 2, two $R^2$'s may be bonded to each other to form a ring.

$R^5$ represents a hydrogen atom, an alkyl group, an aryl group, or a heteroaryl group, $Y^1$, $Y^2$, $Y^3$, and $Y^4$ each independently represent a monovalent substituent. $Y^1$ and $Y^2$, and $Y^3$ and $Y^4$ may be bonded to each other to form a ring.

In a case where there is a plurality of $Y^1$'s, a plurality of $Y^2$'s, a plurality of $Y^3$'s, and a plurality of $Y^4$'s, $Y^1$'s, $Y^2$'s, $Y^3$'s, and $Y^4$'s may be bonded to each other to form a ring.

p and s each independently represent an integer of 0 to 3, and q and r each independently represent an integer of 0 to 2.

Examples of the substituents represented by $R^1$, $R^2$, $Y^1$, $Y^2$, $Y^3$, and $Y^4$ include the substituents described regarding $G^A$ and $G^B$.

$R^3$ and $R^4$ each independently represent a hydrogen atom or an alkyl group. The number of carbon atoms in the alkyl group represented by $R^3$ is, for example, 1 to 4 carbon atoms, and preferably 1 or 2. The alkyl group may be linear or branched. Specifically, examples of the alkyl group include a methyl group, an ethyl group, a n-propyl group, an isopropyl group, a n-butyl group, and an isobutyl group. $R^3$ is preferably a hydrogen atom, a methyl group, or an ethyl group, more preferably a hydrogen atom or a methyl group, and particularly preferably a hydrogen atom.

$X^1$ and $X^2$ each independently represent an oxygen atom (—O—) or —N($R^5$)—. $X^1$ and $X^2$ may be the same as or different from each other. It is preferable that $X^1$ and $X^2$ be the same as each other.

$R^5$ represents a hydrogen atom, an alkyl group, an aryl group, or a heteroaryl group.

$R^5$ is preferably a hydrogen atom, an alkyl group, or an aryl group, and more preferably a hydrogen atom or an alkyl group. The alkyl group, the aryl group, and the heteroaryl group represented by $R^5$ may be unsubstituted or may have a monovalent substituent. Examples of the monovalent substituent include the monovalent substituents described above regarding $G^A$ and $G^B$.

The number of carbon atoms in the alkyl group is preferably 1 to 20, more preferably 1 to 10, even more preferably 1 to 4, and particularly preferably 1 or 2. The alkyl group may be linear or branched.

The aryl group preferably has 6 to 20 carbon atoms, and more preferably has 6 to 12 carbon atoms.

The heteroaryl group may be monocyclic or polycyclic. The number of heteroatoms configuring the ring of the heteroaryl group is preferably 1 to 3. The heteroatom configuring the ring of the heteroaryl group is preferably a nitrogen atom, an oxygen atom, or a sulfur atom. The number of carbon atoms configuring the ring of the heteroaryl group is preferably 3 to 30, more preferably 3 to 18, and even more preferably 3 to 12.

The molecular weight of the squarylium compound represented by Formula (1) or Formula (2) is preferably in a range of 100 to 2,000, and more preferably in a range of 150 to 1,000.

The squarylium compound represented by Formula (2) is specifically described in JP2011-2080101A, and the compounds described in JP2011-208101A can be suitably used as the squarylium dye in the present disclosure.

Specific examples (Specific Examples S-1 to S-41) of the squarylium compound represented by Formula (1) or Formula (2) will be shown below. However, the squarylium compound represented by Formula (1) or Formula (2) are not limited to the following specific examples.

In the following specific examples, "Me" represents a methyl group, and "Ph" represents a phenyl group.

S-1

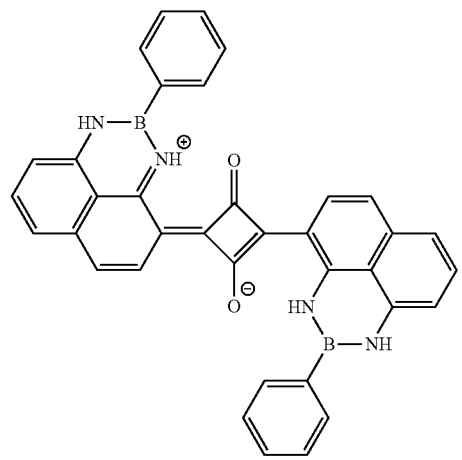

S-2
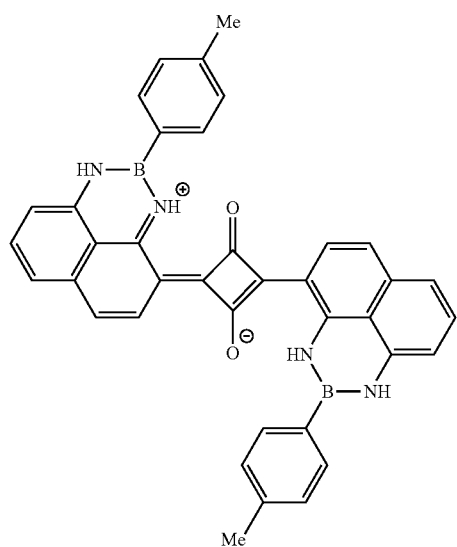
S-3
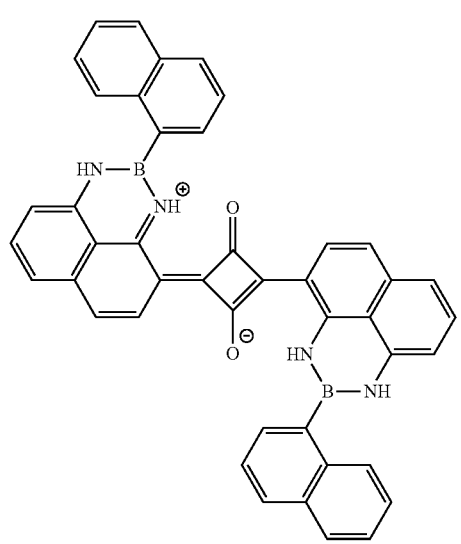
S-4
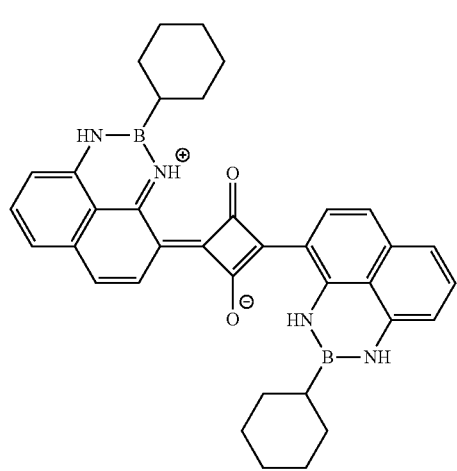
S-5
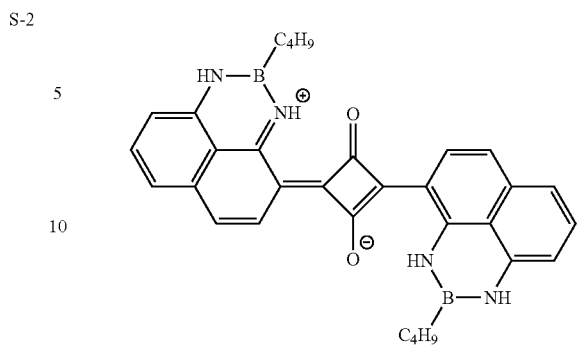
S-6
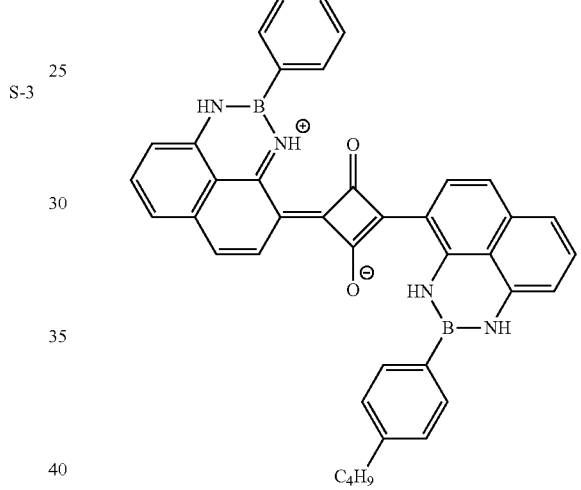
S-7
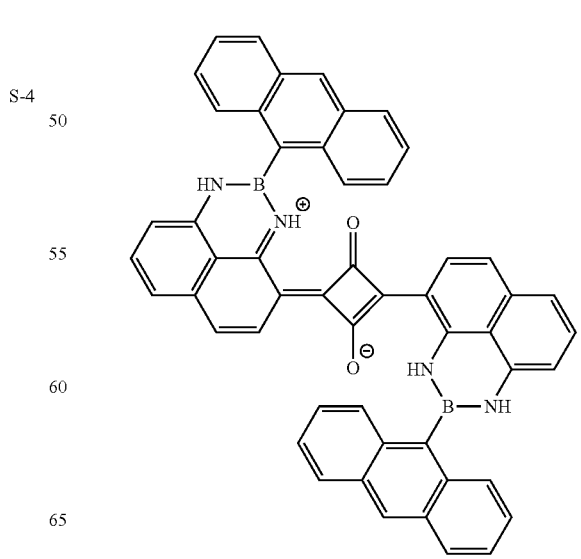

S-8
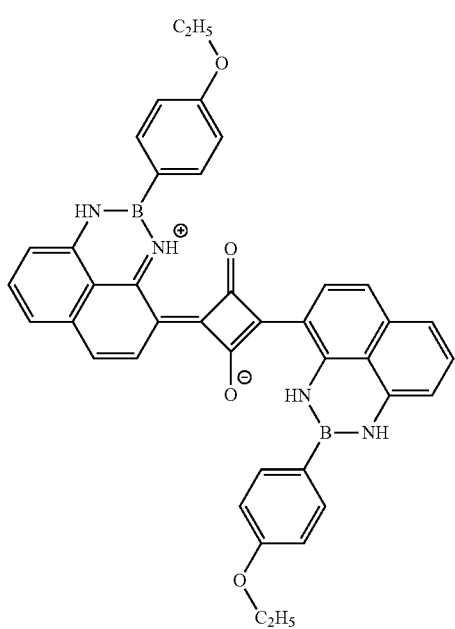
S-9
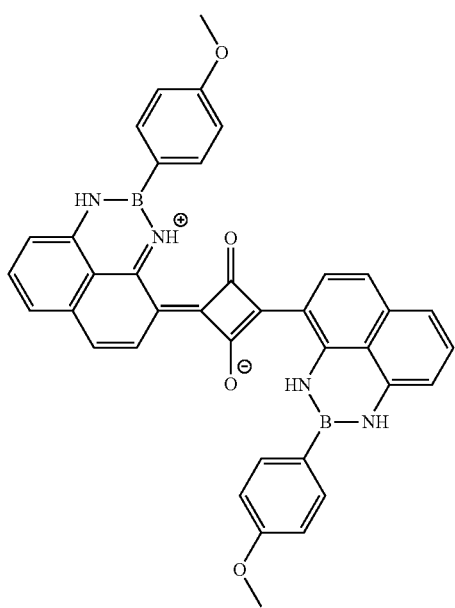
S-10
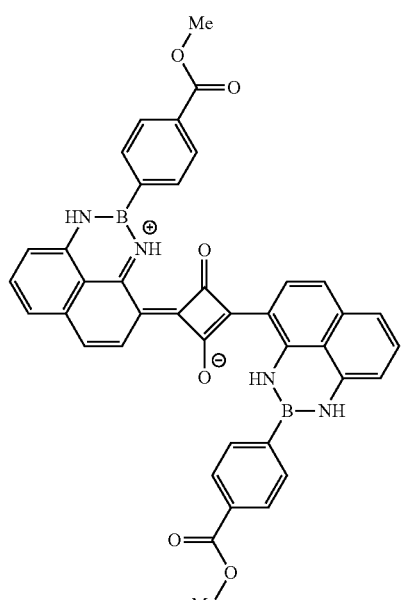
S-11
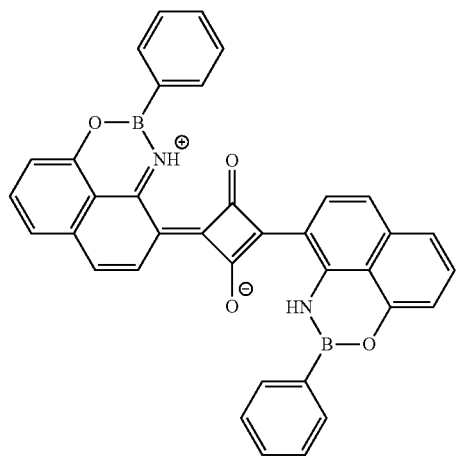
S-12
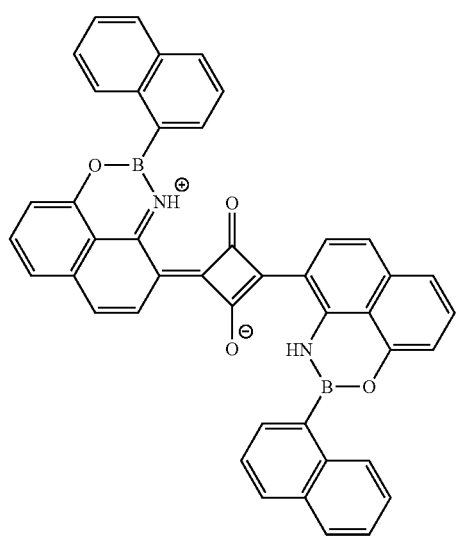

S-13
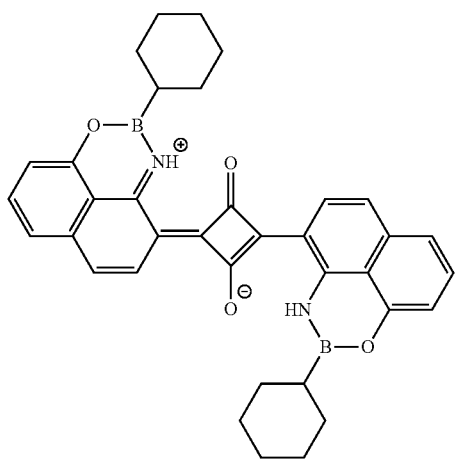
S-14
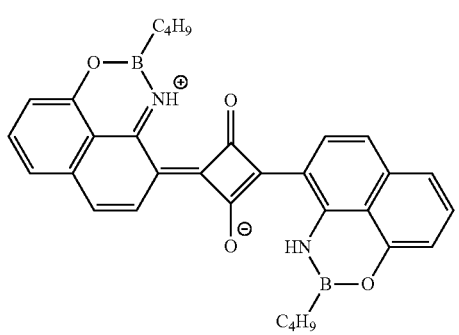
S-15
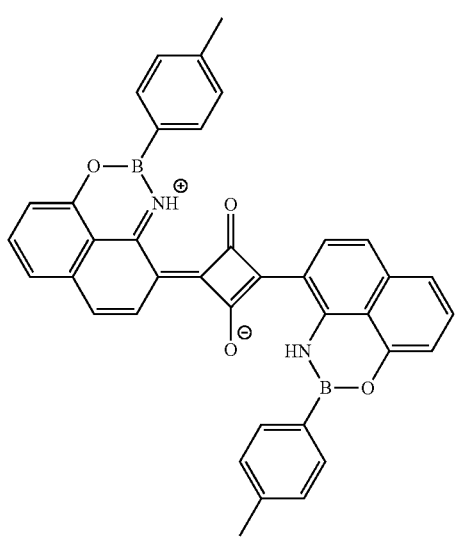
S-16
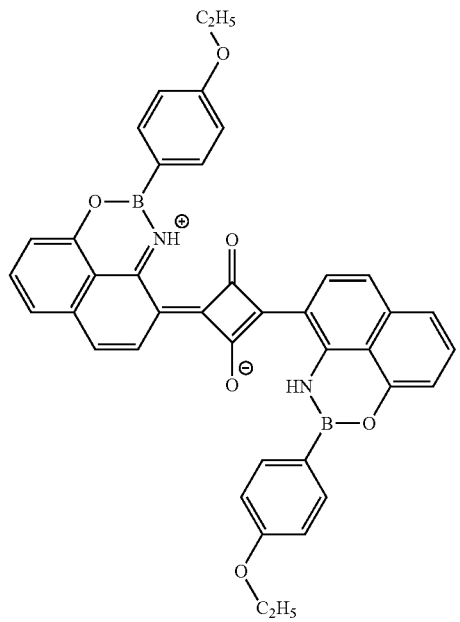
S-17
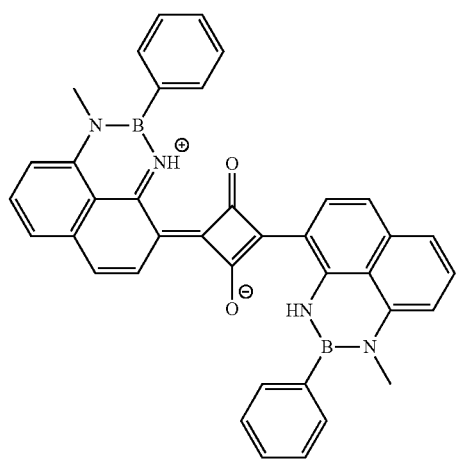
S-18
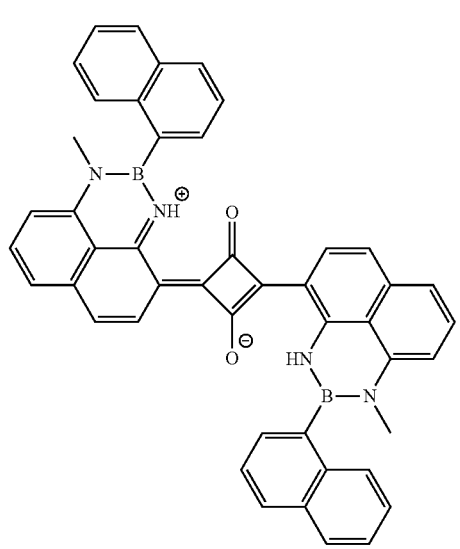

S-19
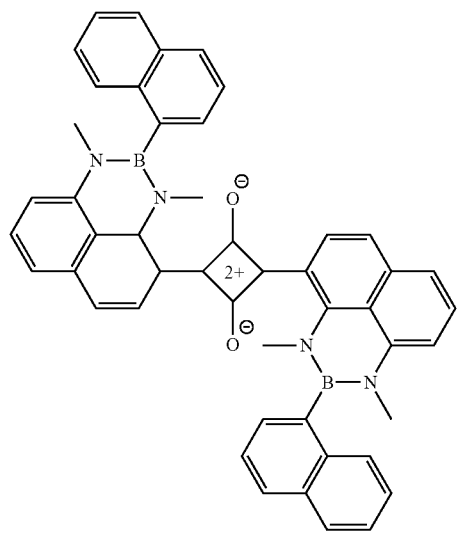
S-22
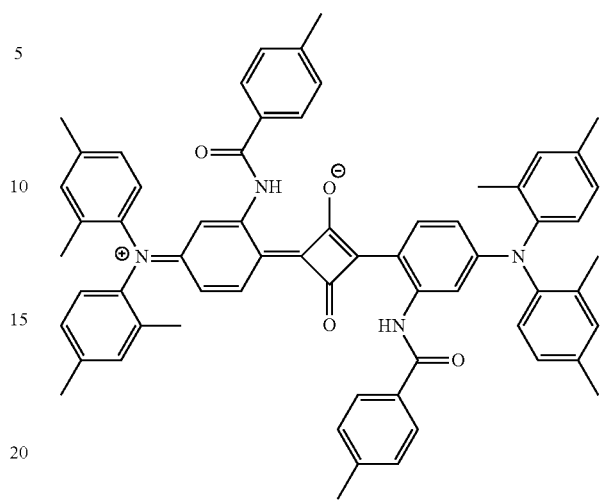
S-20
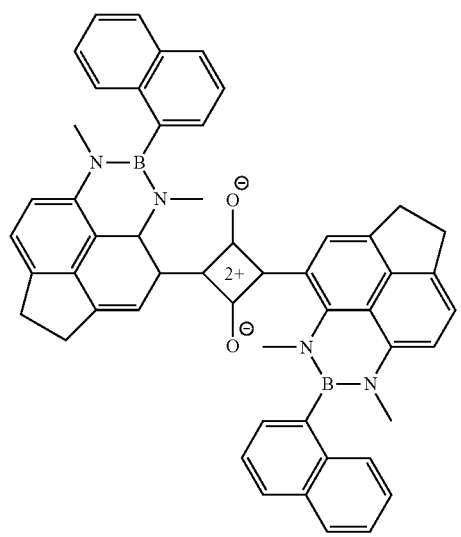
S-23
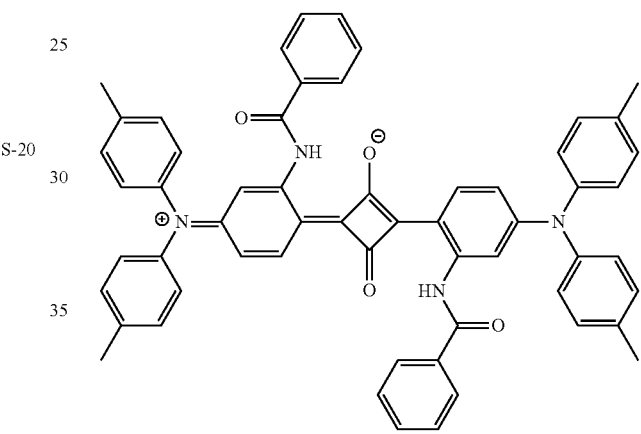
S-24
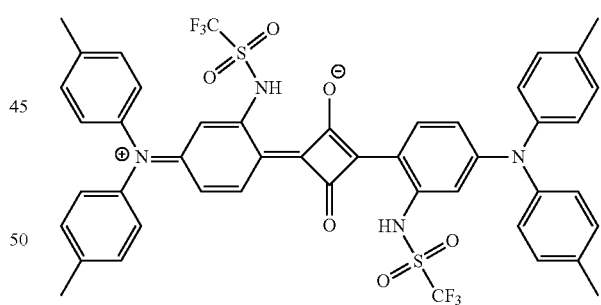
S-21
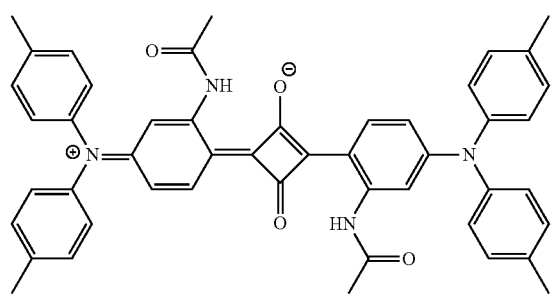
S-25
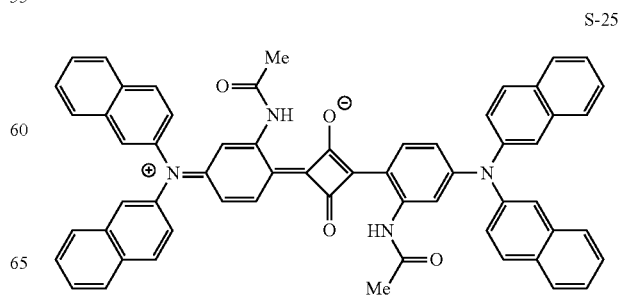

-continued
S-26
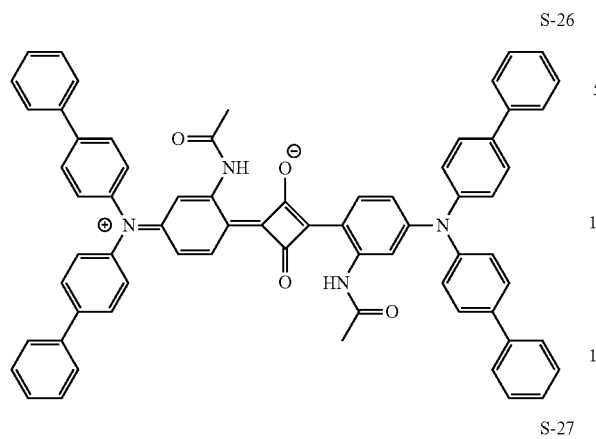
S-27
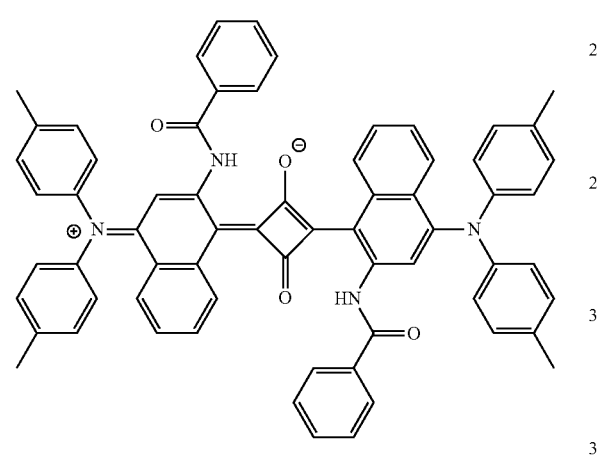
S-28
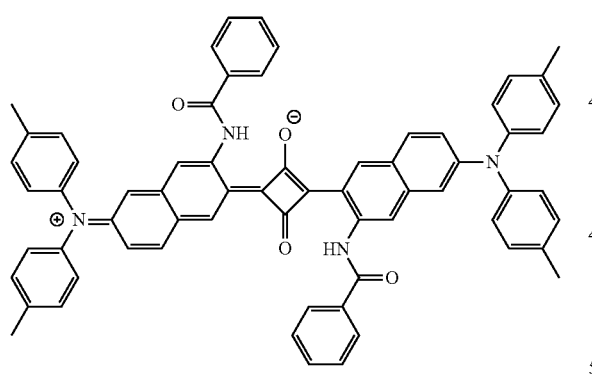
S-29
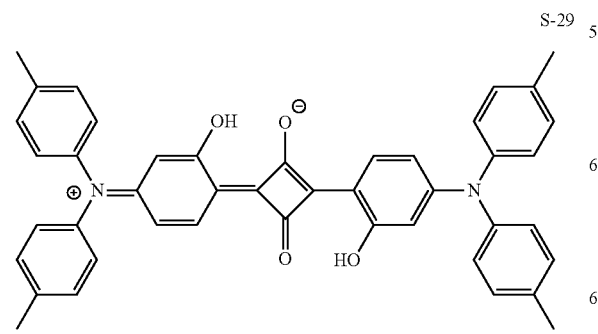
-continued
S-30
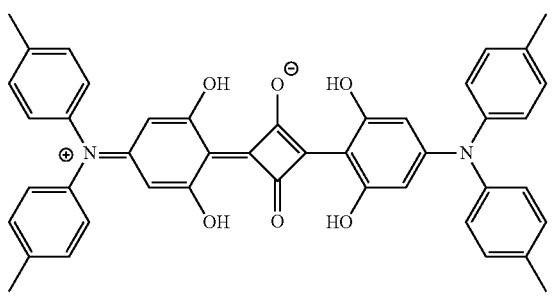
S-31
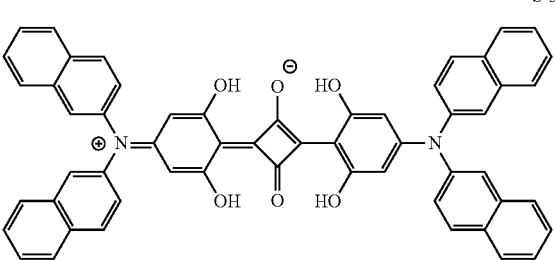
S-32
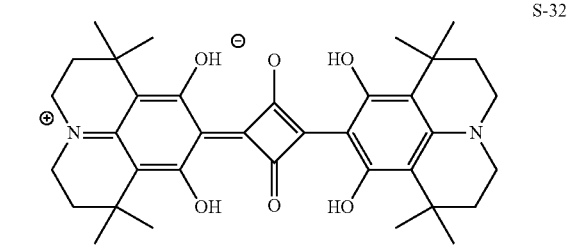
S-33
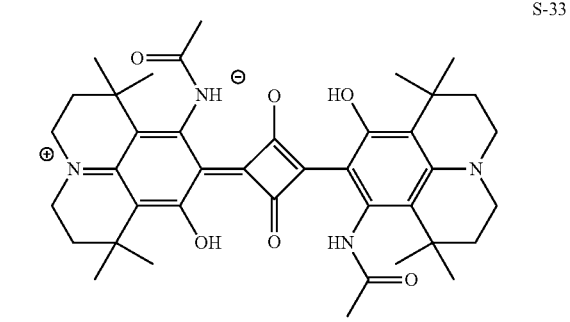
S-34
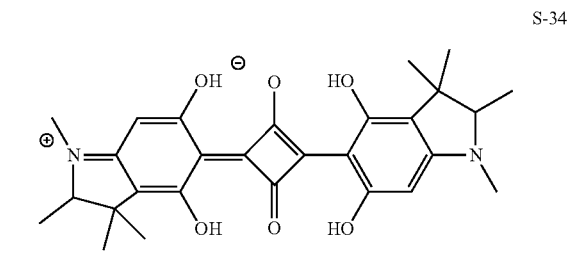
S-35
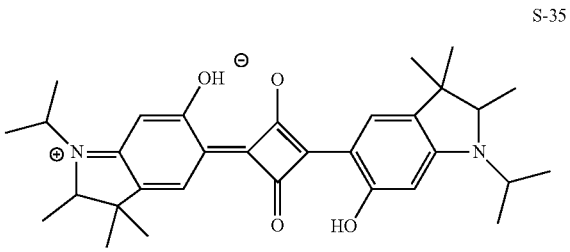

S-36
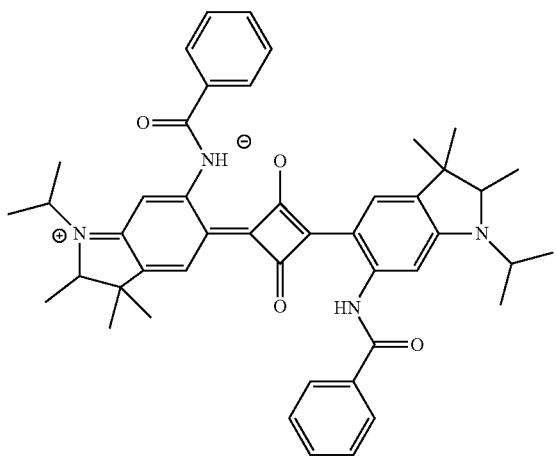

S-37
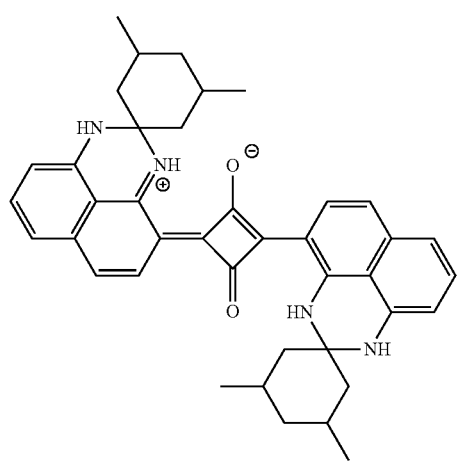

S-38
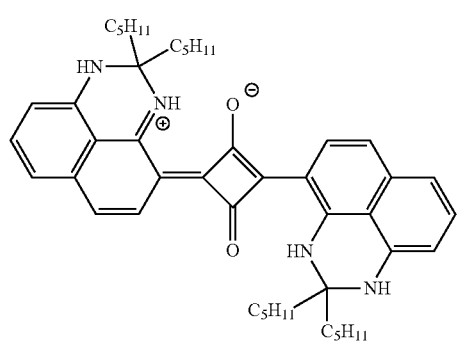

S-39
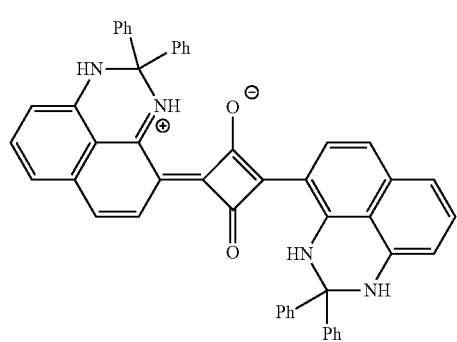

S-40
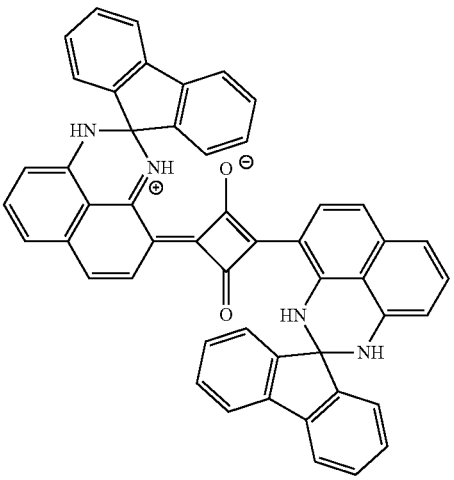

S-41

Among the above, examples of more preferred compounds include Specific Examples S-1, S-3, S-4, S-6, S-9, S-11, S-21, S-24, S-30, S-31, S-37, S-38, S-40, and S-41.

The content of the infrared absorbing dye (preferably the squarylium dye, and more preferably the squarylium compound represented by Formula (1)) contained in the IR ink with respect to the total amount of the IR ink is preferably 0.1% by mass to 10.0% by mass, more preferably 0.2% by mass to 7.0% by mass, and even more preferably 0.3% by mass to 3.0% by mass.

In a case where the content of the infrared absorbing dye is 0.1% by mass or more, the infrared readability of the infrared absorbing image is further improved.

In a case where the content of the infrared absorbing dye is 10.0% by mass or less, the invisibility of the infrared absorbing image is further improved.

(Polymerizable Compound)

The IR ink contains at least one polymerizable compound.

The polymerizable compound is a compound having a polymerizable group.

As the polymerizable group, a radically polymerizable group or a cationically polymerizable group is preferable, and a radically polymerizable group is more preferable.

The polymerizable compound may have only one polymerizable group or two or more polymerizable groups.

As the polymerizable compound, a radically polymerizable compound (that is, a compound having a radically polymerizable group) is preferable.

The radically polymerizable group is preferably an ethylenically unsaturated group, more preferably at least one radically polymerizable group selected from the group consisting of a (meth)acryloyl group, an allyl group, a styryl group, and a vinyl group, and even more preferably a (meth)acryloyl group.

The polymerizable compound preferably includes a polymerizable monomer, and more preferably includes a radically polymerizable monomer.

The polymerizable monomer means a polymerizable compound having a molecular weight of 1,000 or less, and the radically polymerizable monomer means a radically polymerizable compound having a molecular weight of 1,000 or less.

Examples of the radically polymerizable monomer include a (meth)acrylate compound, a (meth)acrylamide compound, and a vinyl compound such as an aromatic vinyl compound, an N-vinyl compound, or a vinyl ether compound.

More specifically, examples of the radically polymerizable monomer include the (meth)acrylate compound, the (meth)acrylamide compound, the vinyl ether compound, the styrene compound, the N-vinyl compound, and the like described in JP2008-208190A and JP2008-266561A.

The radically polymerizable monomer is
preferably at least one compound selected from the group consisting of a (meth)acrylate compound, a (meth) acrylamide compound, and a vinyl ether compound, and
more preferably at least one compound selected from the group consisting of a (meth)acrylate compound and a (meth)acrylamide compound.

The radically polymerizable monomer may be a monofunctional radically polymerizable monomer, a bifunctional radically polymerizable monomer, or a radically polymerizable monomer having 3 or more functional groups.

From the viewpoint of curing speed of the ink, viscosity, and film properties of the image, the IR ink may contain 2 or more monomers among a monofunctional radically polymerizable monomer, a bifunctional radically polymerizable monomer, and a radically polymerizable monomer having 3 or more functional groups.

Examples of the monofunctional radically polymerizable monomer (hereinafter, also called "monofunctional monomer") include;
N-vinyl compounds such as N-vinyl-ε-caprolactam and N-vinylpyrrolidone; monofunctional (meth)acrylate compounds such as 2-phenoxyethyl (meth)acrylate, benzyl (meth)acrylate, cyclic trimethylolpropane formal (meth)acrylate, isobornyl (meth)acrylate, tetrahydrofurfuryl (meth)acrylate, 2-(2-ethoxyethoxy)ethyl (meta)acrylate, octyl (meth)acrylate, decyl (meth)acrylate, tridecyl (meth)acrylate, isodecyl (meth)acrylate, lauryl (meth)acrylate, 3,3,5-trimethylcyclohexyl (meth)acrylate, dicyclopentenyl (meth)acrylate, 4-t-butylcyclohexyl (meth)acrylate, cyclohexyl (meth)acrylate, caprolactone-modified (meth)acrylate, hydroxyethyl (meth)acrylate, hydroxybutyl acrylate, polyethylene glycol (meth)acrylate, polypropylene glycol (meth)acrylate, nonylphenoxypolyethylene glycol acrylate, and nonylphenoxypolypropylene glycol acrylate;
monofunctional vinyl ether compounds such as normal propyl vinyl ether, isopropyl vinyl ether, normal butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexanedimethanol monovinyl ether;
monofunctional (meth)acrylamide compounds such as (meth)acrylamide, N,N-dimethyl (meth)acrylamide, N,N-diethyl (meth)acrylamide, (meth)acryloylmorpholine (ACMO), N-isopropyl (meth)acrylamide, N-hydroxyethyl (meth)acrylamide, N-butyl (meth)acrylamide, N-tert-butyl (meth)acrylamide, N-(1,1)-dimethyl-3-oxobutyl) (meth)acrylamide, N-dodecyl (meth) acrylamide, and N-(butoxymethyl) (meth)acrylamide; and the like.

Examples of the bifunctional radically polymerizable monomer (hereinafter, also called "bifunctional monomer") include
bifunctional (meth)acrylate compounds such as 1,6-hexanediol di(meth)acrylate, dipropylene glycol di(meth)acrylate, 3-methyl-1,5-pentanediol di(meth)acrylate, polyethylene glycol di(meth)acrylate, polypropylene glycol di(meth)acrylate, nonanediol di(meth)acrylate, decanediol di(meth)acrylate, neopentyl glycol di(meth) acrylate, propoxylated neopentyl glycol di(meth)acrylate, ethylene glycol-modified (hereinafter, EO-modified) bisphenol A di(meth)acrylate, dioxane glycol di(meth)acrylate, cyclohexane dimethanol di(meth) acrylate, and tricyclodecane dimethanol di(meth)acrylate;
2-(2-vinyloxyethoxy)ethyl acrylate (VEEA);
bifunctional vinyl compounds such as 1,4-butanediol divinyl ether, cyclohexanedimethanol divinyl ether, diethylene glycol divinyl ether, and triethylene glycol divinyl ether (DVE3);
and the like.

As the bifunctional radically polymerizable monomer, 1,6-hexanediol diacrylate, dipropylene glycol diacrylate, 3-methyl-1,5-pentanediol diacrylate, neopentyl glycol diacrylate, propoxylated neopentyl glycol diacrylate, or EO-modified bisphenol A diacrylate is preferable.

Examples of the radically polymerizable monomer having 3 or more functional groups include pentaerythritol tri(meth) acrylate, pentaerythritol tetra(meth)acrylate, dipentaerythritol penta(meth)acrylate, dipentaerythritol hexa(meth)acrylate, trimethylolpropane tri(meth)acrylate, ditrimethylolpropane tetra(meth)acrylate, trimethylolethane tri(meth)acrylate, glycerin tri(meth)acrylate, and the like.

As the radically polymerizable monomer having 3 or more functional groups,
pentaerythritol triacrylate, pentaerythritol tetraacrylate, dipentaerythritol pentaacrylate, dipentaerythritol hexaacrylate, trimethylolpropane triacrylate, ditrimethylolpropane tetraacrylate, trimethylolethane triacrylate, or glycerintriacrylate is preferable, and
pentaerythritol triacrylate, dipentaerythritol pentaacrylate, or dipentaerythritol hexaacrylate is more preferable.

More specifically, in addition to the above radically polymerizable monomer, it is also possible to use commercially available products described in Shinzo Yamashita, "Handbook of Crosslinking Agents" (1981, Taiseisha Inc.); Kiyomi Kato, "Handbook of UV•EB Curing (Raw Materials)" (1985, Kobunshi Kankokai); RadTech Japan, "Application and Market of UV EB Curing Technology", p. 79 (1989, CMC Publishing CO., LTD.); and Eiichiro Takiyama, "Handbook of Polyester Resin" (1988, NIKKAN KOGYO SHIMBUN, LTD.) and to use monofunctional or bifunctional radically polymerizable monomers known in the related art.

From the viewpoint of further improving the jettability of the IR ink from an ink jet head, it is preferable that the IR ink contain at least one of a monofunctional radically polymerizable monomer or a bifunctional radically polymerizable monomer, and that the total content of the monofunctional radically polymerizable monomer and the bifunctional radically polymerizable monomer be 50% by mass or more (more preferably 60% by mass or more, and even more preferably 70% by mass or more) with respect to the total amount of the IR ink.

The upper limit of the total content of the monofunctional radically polymerizable monomer and the bifunctional radically polymerizable monomer with respect to the total amount of the IR ink is appropriately adjusted in relation to other components, and is, for example, 95% by mass, 90% by mass, or the like.

From the viewpoint of the rub resistance of the Infrared absorbing image, it is preferable that the IR ink contain a radically polymerizable monomer having 2 or more functional groups.

In this case, the total content of the radically polymerizable monomer having 2 or more functional groups is preferably 10% by mass or more (more preferably 20% by mass or more, and even more preferably 30% by mass or more) with respect to the total amount of the IR ink.

The upper limit of the total content of the radically polymerizable monomer having 2 or more functional groups with respect to the total amount of the IR ink is appropriately adjusted in relation to other components, and is, for example, 80% by mass, 70% by mass, 60% by mass, or the like.

From the viewpoint of further improving the infrared readability of the security image after rub, the mass-based content of the radically polymerizable monomer having 2 or more functional groups in the IR ink is preferably higher than the mass-based content of the radically polymerizable monomer having 2 or more functional groups in the color ink (hereinafter, called "condition X").

In such a preferred aspect, the mass-based content of the radically polymerizable monomer having 2 or more functional groups in the IR ink may be higher than the mass-based content of the radically polymerizable monomer having 2 or more functional groups in at least one color ink. That is, the ink set may include a color ink that satisfies the condition X and a color ink that does not satisfy the condition X.

From the viewpoint of further improving the infrared readability after rub of the security image, the mass-based content of the radically polymerizable monomer having 2 or more functional groups in the IR ink is preferably higher than the mass-based content of the radically polymerizable monomer having 2 or more functional groups in all color inks included in the ink set (that is, it is preferable that the ink set include a color ink satisfying the condition X and do not include a color ink not satisfying the condition X).

In the condition X,
the mass-based content of the radically polymerizable monomer having 2 or more functional groups in the IR ink means a mass ratio (% by mass) of the content of the radically polymerizable monomer having 2 or more functional groups in the IR ink to the total amount of the IR ink, and
the mass-based content of the radically polymerizable monomer having 2 or more functional groups in the color ink means a mass ratio (% by mass) of the content of the radically polymerizable monomer having 2 or more functional groups in the color ink to the total amount of the color ink.

In the condition X, the IR ink contains a radically polymerizable monomer having 2 or more functional groups, but the color ink may or may not contain a radically polymerizable monomer having 2 or more functional groups.

From the viewpoint of further improving the infrared readability of the security image after rub, in the condition X, it is preferable that both the IR ink and color ink contain a radically polymerizable monomer having 2 or more functional groups.

From the viewpoint of further improving the infrared readability of the security image after rub, in the condition X, the ratio [mass-based content of radically polymerizable monomer having 2 or more functional groups in IR ink/mass-based content of radically polymerizable monomer having 2 or more functional groups in color ink] is preferably 1.01 to 1.50, more preferably 1.02 to 1.30, and even more preferably 1.05 to 1.20.

It is preferable that the polymerizable compound in the IR ink contain at least one vinyl monomer having a hetero ring.

In a case where the polymerizable compound includes such a vinyl monomer, polymerization inhibition caused by oxygen is suppressed, and the curing properties of the IR ink are further improved.

The vinyl monomer having a hetero ring may be a monofunctional monomer or a monomer having 2 or more functional groups.

From the viewpoint of further improving the curing properties of the IR ink and further reducing the viscosity of the IR ink (for example, from the viewpoint of further improving the jettability of the IR ink from an ink jet head), the vinyl monomer having a hetero ring is preferably a monofunctional monomer.

Examples of the vinyl monomer having a hetero ring include N-vinyl-ε-caprolactam, N-vinylpyrrolidone, γ-butyrolactone (meth)acrylate, mevalonic lactone (meth)acrylate, (meth)acryloylmorpholine, pentamethyl piperidyl (meth)acrylate, N-(2-methacrylamidoethyl) ethylene urea, 1-vinylimidazole, glycidyl (meth)acrylate, tetrahydrofurfuryl (meth)acrylate, alkoxylated tetrahydrofurfuryl (meth)acrylate, cyclic trimethylolpropane formal (meth)acrylate, 2-ethyl-2-methyl-4-(meth)acryloyloxymethyl dioxolane, 2-isobutyl-2-methyl-4-(meth)acryloyloxymethyl dioxolane, 2-exo-cyclohexyl-4-(meth)acryloyloxymethyl dioxolane, (3-ethyl-3-oxetanyl)methyl (meth)acrylate, cyclohexene oxide-modified (meth)acrylate, and the like.

From the viewpoint of further improving the curing properties of the IR ink and further reducing the viscosity of the IR ink (for example, from the viewpoint of further improving the jettability of the IR ink from an ink jet head), as the vinyl monomer having a hetero ring, N-vinyl-ε-caprolactam, acryloylmorpholine, tetrahydrofurfuryl acrylate, cyclic trimethylolpropane formal acrylate, or 2-ethyl-2-methyl-4-(meth)acryloyloxymethyl dioxolane is particularly preferable.

In a case where the IR ink contains a vinyl monomer having a hetero ring, the content of the vinyl monomer having a hetero ring with respect to the total amount of the IR ink is preferably 5% by mass to 50% by mass, more preferably 10% by mass to 40% by mass, and even more preferably 15% by mass to 40% by mass.

The polymerizable compound may include at least one polymerizable oligomer (for example, a radically polymerizable oligomer).

The polymerizable oligomer means a polymerizable compound having a molecular weight of more than 1,000 and 10,000 or less.

From the viewpoint of polymerization properties, the polymerizable group in the polymerizable oligomer is preferably a (meth)acryloyl group, a vinyl ether group, or a styryl group, more preferably a (meth)acryloyl group, and particularly preferably an acryloyl group.

From the viewpoint of the ink viscosity, the curing sensitivity, and the adhesiveness between the substrate and the image, the polymerizable oligomer is preferably at least one oligomer selected from the group consisting of a polyester oligomer, a urethane oligomer, a modified polyether oligomer, an acrylic oligomer, and an epoxy oligomer.

The polyester oligomer refers to polyester having 1 or more polymerizable groups, the urethane oligomer refers to polyurethane having 1 or more polymerizable groups, the modified polyether oligomer refers to a modified polyether resin having 2 or more polymerizable groups, the acrylic oligomer means an acrylic resin having 1 or more polymerizable groups, and the epoxy oligomer means an epoxy resin having 1 or more polymerizable groups.

From the viewpoint of improving the curing properties of the ink and improving the adhesiveness between the image and the substrate, among the above polymerizable oligomers, an epoxy oligomer (preferably epoxy acrylate) or a urethane oligomer (preferably urethane acrylate) is preferable.

From the viewpoint of improving film properties such as flexibility while suppressing an increase in viscosity, a polyether oligomer, an acrylic oligomer, and a polyester oligomer are preferable.

As the polymerizable oligomer, from the viewpoint of the balance among sensitivity, adhesiveness, flexibility, and viscosity, at least one of a polyester oligomer (preferably polyester acrylate) or a urethane oligomer (preferably urethane acrylate) is particularly preferable.

Examples of the polymerizable oligomer include;
CN9001, CN9002, CN902J75, CN961H81, CN963A80, CN963B80, CN963E75, CN964, CN964B85, CN965, CN968, CN981, CN982A75, CN983, CN984, CN9893, CN996, CN970A60, CN972, CN975, CN978, CN991, CN992, CN999, CN816, CN817, CN818, CN292, CN293, CN294, CN736, CN738, CN750, CN2100, CN2200, and CN2101 (manufactured by Sartomer Company, Inc.);

Ebecryl 230, Ebecryl 244, Ebecryl 245, Ebecryl 270, Ebecryl 284, Ebecryl 285, Ebecryl 4830, Ebecryl 4858, Ebecryl 8402, Ebecryl 8804, Ebecryl 8807, Ebecryl 8803, Ebecryl 8800, Ebecryl 254, Ebecryl 264, Ebecryl 1259, Ebecryl 1264, Ebecryl 9260, Ebecryl 8210, Ebecryl 5129, Ebecryl 1290, Ebecryl 210, Ebecryl 204, Ebecryl 220, Ebecryl 4450, Ebecryl 770, Ebecryl 81, Ebecryl 84, Ebecryl 83, Ebecryl 80, Ebecryl 657, Ebecryl 800, Ebecryl 810, Ebecryl 812, Ebecryl 1657, Ebecryl 450, Ebecryl 670, Ebecryl 830, Ebecryl 870, Ebecryl 2870, Ebecryl 1870, Ebecryl 745, Ebecryl 767, Ebecryl 1701, and Ebecryl 1755 (manufactured by Daicel Cytec Co., Ltd.);

Laromer LR8765, Laromer LR8986, Laromer LR88987, Laromer LR8739, and Laromer LR8983 (manufactured by BASF SE);

NK OLIGO EA-6310, NK OLIGO EA1020, and NK OLIGO EA-6320 (manufactured by SHIN-NAKA-MURA CHEMICAL CO., LTD.);
and the like.

In a case where the IR ink contains a polymerizable oligomer, the content of the polymerizable oligomer with respect to the total amount of the IR ink is preferably 0.5% by mass to 15% by mass, more preferably 1% by mass to 10% by mass, and even more preferably 1.5% by mass to 8% by mass.

(Dispersant)

From the viewpoint of the dispersibility of the infrared absorbing dye, the IR ink may contain at least one dispersant.

For the dispersant, the descriptions in known publications, such as paragraphs "0152" to "0158" of JP2011-225848A and paragraphs "0132" to "0149" of JP2009-209352A, can be appropriately referred to.

The dispersant is preferably a polymer dispersant.

Specific examples of known and easily available polymer dispersants include a vinyl polymer, modified polyurethane, a salt of polyaminoamide and an acid ester, modified polyethyleneimine, and modified polyallylamine, and the like.

Examples of a commercially available dispersants include;

a SOLSPERSE (registered trademark) series (for example, SOLSPERSE 16000, 21000, 32000, 41000, 41090, 43000, 44000, 46000, 54000, and the like) of The Lubrizol Corporation;

a DISPERBYK (registered trademark) series of BYK-Chemie GmbH (for example, DISPERBYK 102, 110, 111, 118, 170, 190, 194N, 2015, 2090, 2096, and the like);

a TEGO (registered trademark) Dispers series of Evonik Degussa GmbH (for example, TEGO Dispers 610, 610S, 630, 651, 655, 750W, 755W, and the like);

a DISPARLON (registered trademark) series of Kusumoto Chemicals, Ltd. (for example, DA-375, DA-1200, and the like);

a FLOWLEN series of KYOEISHA CHEMICAL Co., LTD. (for example, WK-13E, G-700, G-900, GW-1500, GW-1640, WK-13E, and the like);
and the like.

The content of the dispersant with respect to the total amount of the IR ink is preferably 0.03% by mass to 10% by mass, more preferably 0.06% by mass to 7% by mass, and even more preferably 0.1% by mass to 5% by mass.

In a case where the IR ink contains a dispersant, the ratio of the content of the dispersant to the infrared absorbing dye is preferably 10% to 150%, more preferably 15% to 100%, and even more preferably 20% to 60%, based on mass.

(Photopolymerization Initiator)

The IR ink may contain at least one photopolymerization initiator.

The photopolymerization initiator can be selected from a radical polymerization initiator, a cationic polymerization initiator, and an anionic polymerization initiator depending on the polymerization properties of the polymerizable compound.

As the photopolymerization initiator, from the viewpoint of curing properties of the IR ink, a radical polymerization initiator is particularly preferable.

The radical polymerization initiator is preferably a photopolymerization initiator that generates radicals by the irradiation with light and initiates a polymerization reaction of the radically polymerizable monomer described above.

Examples of the radical polymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) carbon halogen bond-containing compound, (m) alkylamine compound, and the like.

As the photopolymerization initiators, one of the above compounds (a) to (m) may be used alone, or two or more compounds among the above compounds (a) to (m) may be used in combination.

As the photopolymerization initiator, (a), (b), and (e) described above are more preferable.

Preferred examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferred examples thereof include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aloylphosphonic acid ester described in JP1982-30704A (JP-S57-30704A), the dialkoxybenzophenone described in JP1985-26483B (JP-S60-26483B), the benzoin ethers described in JP1985-26403B (JP-S60-26403B) and JP1987-81345A (JP-S62-81345A), the α-aminobenzophenones described in JP1989-34242B (JP-H01-34242B), U.S. Pat. No. 4,318,791A, and EP0284561A1,
the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-9597B (JP-H02-9597B), the acylphosphine described in JP1990-9596B (JP-H02-9596B), the thioxanthones described in JP1988-61950B (JP-S63-61950B), the coumarins described in JP1984-42864B (JP-S59-42864B), and the like.

In addition, the polymerization initiators described in JP2008-105379A and JP2009-114290A are also preferable.

Among the photopolymerization initiators, (a) carbonyl compound or (b) acylphosphine oxide compound is more preferable. Specific examples thereof include bis(2,4,6-trimethylbenzoyl)phenylphosphine oxide (for example, IRGACURE (registered trademark) 819 manufactured by BASF SE and Omnirad 819 (manufactured by IGM Resins B. V.), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example IRGACURE (registered trademark) 907 manufactured by BASF SE), 1-hydroxycyclohexylphenylketone (for example, IRGACURE (registered trademark) 184 manufactured by BASF SE), 2,4,6-trimethylbenzoyldiphenylphosphine oxide (for example, DAROCUR (registered trademark) TPO and LUCIRIN (registered trademark) TPO (manufactured by BASF SE), and Omnirad TPO H (manufactured by IGM Resins B. V.)), and the like.

Among these, from the viewpoint of sensitivity improvement, compatibility with LED light, and the like, as the photopolymerization initiator, (b) an acylphosphine oxide compound is preferable, and a monoacylphosphine oxide compound (particularly preferably 2,4,6-trimethylbenzoyl-diphenylphosphine oxide) or a bisacylphosphine oxide compound (particularly preferably bis(2,4,6-trimethylbenzoyl) phenylphosphine oxide) is more preferable.

The content of the photopolymerization initiator in the IR ink with respect to the total amount of the IR ink is preferably 1.0% by mass to 25.0% by mass, more preferably 2.0% by mass to 20.0% by mass, and even more preferably 3.0% by mass to 15.0% by mass.

(Colorant Sensitizer)

The IR ink may contain at least one colorant sensitizer.

Examples of the colorant sensitizer include a thioxanthone-based compound, a thiochromanone-based compound, ethyl 4-(dimethylamino)benzoate (EDB), anthraquinone, a 3-acylcoumarin derivative, terphenyl, styryl ketone, 3-(aroylmethylene)thiazoline, camphorquinone, eosin, rhodamine, erythrosine, a compound represented by General Formula (i) described in JP2010-24276A, a compound represented by General Formula (I) described in JP1994-107718A (JP-H06-107718A), and the like.

As the colorant sensitizer, at least one of a thioxanthone-based compound or a thiochromanone-based compound is preferable.

For the thioxanthone compound and the thiochromanone compound, paragraphs "0066" to "0077" of JP2012-46724A may be referred to.

As the thioxanthone compound, commercially available products on the market may be used. Examples of the commercially available products include a SPEEDCURE series (examples: SPEEDCURE 7010, SPEEDCURE CPTX, SPEEDCURE ITX, and the like) manufactured by Lambson Ltd., and the like.

It is preferable that at least one of the colorant sensitizers have a molecular weight of 1,000 or more. In a case where at least one of the colorant sensitizers has a molecular weight of 1,000 or more, it is possible to suppress a phenomenon (so-called migration) where monomer components are transferred to the outside from the recorded image. It is preferable that at least one of the colorant sensitizers have a molecular weight of 1,000 or more, particularly from the viewpoint of using the ink in the field of food packaging and cosmetic packaging, such as packaging films for foods or packaging materials for cosmetics, where the safety of the substrate is strictly required.

Especially, it is preferable that the ink contain a thioxanthone-based compound having a molecular weight of 1,000 or more or a thiochromanone-based compound having a molecular weight of 1,000 or more.

The molecular weight of the colorant sensitizer is more preferably in a range of 1,000 to 100,000, and more preferably in a range of 1,000 to 50,000.

The content of the colorant sensitizer in the IR ink with respect to the total amount of the IR ink is preferably 1.0% by mass to 15.0% by mass, more preferably 1.5% by mass to 10.0% by mass, and even more preferably 2.0% by mass to 6.0% by mass.

(Surfactant)

The IR ink may contain at least one surfactant.

Examples of the surfactant include the surfactants described in JP1987-173463A (JP-S62-173463A) and JP1987-183457A (JP-S62-183457A). Examples of the surfactant include anionic surfactants such as dialkyl sulfosuccinate, alkyl naphthalene sulfonate, and a fatty acid salt; nonionic surfactants such as siloxanes including polyoxyethylene alkyl ether, polyoxyethylene alkyl allyl ether, acetylene glycol, a polyoxyethylenepolyoxypropylene block copolymer, modified polydimethylsiloxane (for example, BYK-307 manufactured by BYK-Chemie GmbH.), and the like; cationic surfactants such as an alkylamine salt and a quaternary ammonium salt, and betaine-based surfactants such as carbobetaine and sulfobetaine.

Instead of a surfactant, an organic fluoro compound may also be used. The organic fluoro compound is preferably hydrophobic. Examples of the organic fluoro compound include a fluorine-containing surfactant, an oil-like fluorine-containing compound (for example, fluorine oil), and a solid-like fluorine compound resin (for example, a tetrafluoroethylene resin). Examples of these include the compounds described in JP1982-9053B (JP-S57-9053B) (sections 8 to 17) and JP1987-135826A (JP-S62-135826A).

In a case where the IR ink contains a surfactant, the content of the surfactant with respect to the total amount of the IR ink is preferably 0.01% by mass to 5% by mass, more preferably 0.05% by mass to 3% by mass, and even more preferably 0.05% by mass to 1.5% by mass.

(Polymerization Inhibitor)

The IR ink may contain at least one polymerization inhibitor.

Examples of the polymerization inhibitor include p-methoxyphenol, quinones (for example, hydroquinone, benzoquinone, methoxybenzoquinone, and the like), phenothiazine, catechols, alkylphenols (for example, dibutylhydroxytoluene (BHT) and the like), alkylbisphenols, zinc dimethyldithiocarbamate, copper dimethyldithiocarbamate, copper dibutyldithiocarbamate, copper salicylate, thiodipropionic acid esters, mercaptobenzimidazole, phosphites, 2,2,6,6-tetramethylpiperidin-1-oxyl (TEMPO), 2,2,6,6-tetramethyl-4-hydroxypiperidin-1-oxyl (TEMPOL), a tris(N-nitroso-N-phenylhydroxylamine) aluminum salt (also known as cupferron Al), and the like.

Among these, at least one polymerization inhibitor selected from p-methoxyphenol, catechols, quinones, alkylphenols, TEMPO, TEMPOL, and a tris(N-nitroso-N-phenylhydroxylamine) aluminum salt is preferable, and at least one polymerization inhibitor selected from p-methoxyphenol, hydroquinone, benzoquinone, BHT, TEMPO, TEMPOL, and a tris(N-nitroso-N-phenylhydroxylamine) aluminum salt is more preferable.

In a case where the IR ink contains a polymerization inhibitor, the content of the polymerization inhibitor is preferably 0.01% by mass to 2.0% by mass with respect to the total amount of the IR ink.

(Organic Solvent)

The IR ink may contain at least one organic solvent.

Examples of the organic solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester-based solvents such as ethyl acetate, butyl acetate, isopropyl acetate, ethyl lactate, butyl lactate, and isopropyl lactate; ether-based solvents such as diethyl ether, tetrahydrofuran, and dioxane; glycol ether-based solvents such as ethylene glycol monomethyl ether, ethylene glycol dimethyl ether, and propylene glycol monomethyl ether; glycol ether acetate-based solvents such as propylene glycol monomethyl ether acetate; and the like.

In a case where the IR ink contains an organic solvent, the content of the organic solvent with respect to the total amount of the IR ink is preferably 1% by mass or less, more preferably 0.5% by mass or less, and even more preferably 0.1% by mass or less. The IR ink may have a composition that does not contain an organic solvent (that is, the content of the organic solvent may be 0% by mass with respect to the total amount of the IR ink).

(Resin)

The IR ink may contain at least one resin.

Examples of the resin include an epoxy resin, a vinyl chloride resin, a vinyl acetate-based resin, a polyester, a (meth)acrylic resin (for example, a copolymer of methyl methacrylate and n-butyl methacrylate), a chlorinated polyolefin, a polyketone, and the like.

The weight-average molecular weight (Mw) of the resin is preferably 3,000 to 200,000, more preferably 5,000 to 200,000, and even more preferably 10,000 to 150,000.

In a case where the IR ink contains a resin, the content of the resin is preferably 1% by mass to 10% by mass with respect to the total amount of the IR ink.

(Water)

The IR ink may contain a small amount of water.

Specifically, the content of water with respect to the total amount of the IR ink is preferably 3% by mass or less, more preferably 2% by mass or less, and particularly preferably 1% by mass or less. The IR ink is preferably a non-aqueous photocurable ink composition that substantially does not contain water.

(Other Components)

The IR ink may contain other components in addition to the above components.

Examples of those other components include an ultraviolet absorber, a co-sensitizer, an antioxidant, an antifading agent, a conductive salt, and the like. For those other components, known publications such as JP2011-225848A and JP2009-209352A can be appropriately referred to.

(Preferred Physical Properties of IR Ink)

The viscosity of the IR ink is not particularly limited.

The viscosity of the IR ink at 25° C. is preferably 10 mPa·s to 60 mPa·s, more preferably 10 mPa·s to 40 mPa·s, and even more preferably 10 mPa·s to 30 mPa·s. The viscosity of the IR ink can be adjusted, for example, by adjusting the compositional ratio of components contained in the ink.

The viscosity is a value measured using a viscometer (for example, VISCOMETER RE-85L (manufactured by TOKI SANGYO CO., LTD.)).

In a case where the viscosity of the IR ink is in the above range, the jetting stability of the IR ink from an ink jet head can be further improved.

The surface tension of the IR ink is not particularly limited.

The surface tension of the IR ink at 30° C. is preferably 20 mN/m to 30 mN/m, and more preferably 23 mN/m to 28 mN/m. In a case where the surface tension of the IR ink is 30 mN/m or less, wettability is excellent. In a case where the surface tension of the IR ink is 20 mN/m or more, bleeding is further suppressed, and permeability is further improved.

The surface tension is a value measured using a surface tensiometer (for example, DY-700 (manufactured by Kyowa Interface Science Co., Ltd.)).

<Color Ink>

The color ink contains a polymerizable compound and a colored colorant and satisfies the ratio of the maximum value of the absorbance of the color ink in a wavelength range of 750 nm to 1,000 nm (that is, Abs (NIR)) to the maximum value of the absorbance of the infrared-absorbing ink jet ink in a wavelength range of 750 nm to 1,000 nm (that is, Abs (NIR)) (that is, Abs (NIR) ratio=Abs (NIR) of color ink/Abs (NIR) of IR ink) of 0.10 or less.

Preferred aspects of the color ink are, but are not limited to, the ink Y, the ink M, and the ink C described above.

In a case where the Abs (NIR) ratio is 0.1 or less, as described above, the phenomenon where the infrared readability deteriorates in a case where the security image is irradiated with infrared rays to read the infrared absorbing image in the security image (specifically, the phenomenon where not only the infrared absorbing image but also the color image is read) is suppressed.

From the viewpoint of making such an effect more effectively exerted, the Abs (NIR) ratio is preferably 0.07 or less.

The Abs (NIR) ratio may be 0 or greater than 0.

(Polymerizable Compound)

The color ink contains at least one polymerizable compound.

Preferred aspects of the polymerizable compound in the color ink (for example, preferred compounds, preferred compositions, preferred contents, and the like) are the same as the preferred aspects of the polymerizable compound in the IR ink. Therefore, for the preferred aspects of the polymerizable compound in the color ink, the description of the preferred aspects of the polymerizable compound in the IR ink can be appropriately referred to.

It is preferable that at least one (more preferably both) of the polymerizable compound contained in the IR ink or the polymerizable compound contained in the color ink contain the aforementioned vinyl monomer having a hetero ring. In a case where the polymerizable compound includes such a vinyl monomer, polymerization inhibition caused by oxygen is suppressed, and the curing properties of the IR ink are further improved.

(Colored Colorant)

The color ink contains at least one colored colorant.

The colored colorant is preferably at least one colorant selected from the group consisting of an organic dye and an organic pigment.

From the viewpoint of light fastness, the colored colorant is particularly preferably at least one colorant selected from the group consisting of organic pigments.

Examples of organic pigment include the pigments described in Seijiro Ito, "Pigment Dictionary" (2000), W. Herbst, K. Hunger "Industrial Organic Pigments", Isao Hashimoto "Handbook of Organic Pigments" (2006), JP2002-12607A, JP2002-188025A, JP2003-26978A, JP2003-342503A, and the like.

Examples of the organic pigment include a yellow pigment, a magenta pigment, a red pigment, a violet pigment, a pink pigment, a cyan pigment, a blue pigment, a green pigment, an orange pigment, a brown pigment, a black pigment, and the like.

The yellow pigment is a pigment that takes on a yellow color, and examples thereof include a monoazo pigment, a disazo pigment, a non-benzidine-based azo pigment, an azo lake pigment, a condensed azo pigment, an acidic dye lake pigment, a basic dye lake pigment, an anthraquinone pigment, a quinophthalone pigment, a pyrazolone pigment, an acetron pigment, a metal complex salt pigment, a nitroso pigment, a metal complex azomethine pigment, a benzimidazolone pigment, an isoindoline pigment, and the like.

Among these, examples of preferred yellow pigments include C. I. Pigment Yellow (hereinafter, abbreviated to PY) 1, PY3, PY12, PY13, PY14, PY16, PY17, PY18, PY24, PY60, PY74, PY83, PY93, PY94, PY95, PY97, PY100, PY109, PY110, PY115, PY117, PY120, PY128, PY138, PY139, PY150, PY151, PY153, PY154, PY155, PY166, PY167, PY173, PY175, PY180, PY181, PY185, PY194, PY213, PY214, PY219, and the like. Among these, a benzimidazolone pigment such as a monoazo pigment, a disazo pigment, or an acetron pigment and an isoindoline pigment are preferable, and an isoindoline pigment is most preferable.

The magenta pigment and the red pigment are pigments that take on a magenta color and a red color, respectively.

Examples of the magenta pigment and the red pigment include a monoazo-based pigment, a β-naphthol pigment, a disazo pigment, an azo lake pigment, a condensed azo pigment, an acidic dye lake pigment, a basic dye lake pigment, an anthraquinone-based pigment, a thioindigo pigment, a perinone pigment, a perylene pigment, a quinacridone pigment, an isoindolinone pigment, an alizarin lake pigment, a naphtholone pigment, a naphthol AS-based lake pigment, a naphthol AS pigment, a diketopyrrolopyrrole pigment, and the like.

Among these, examples of the magenta pigment and the red pigment include C. I. Pigment Red (hereinafter, abbreviated to PR) 1, PR2, PR3, PR4, PR5, PR6, PR21, PR38, PR42, PR46, PR53:1, PR57:1, PR52:1, PR46, PR48, PR81, PR83, PR88, PR144, PR149, PR166, PR179, PR178, PR190, PR224, PR123, PR224, PR19, PR122, PR202, PR207, PR209, PR180, PR83, PR170, PR171, PR172, PR174, PR175, PR176, PR177, PR179, PR185, PR194, PR208, PR214, PR220, PR221, PR242, PR247, PR254, PR255, PR256, PR262, PR268, PR264, PR269, PR272, PR282, C. I. Pigment Violet 19, and the like.

The magenta pigment and the red pigment are preferably quinacridone pigments which are preferably unsubstituted quinacridone, dimethyl quinacridone, dichloroquinacridone, and mixed crystals of these, such as PR42, pr122, PR202, PR209, PR282, and C. I. Pigment Violet (hereinafter, abbreviated to PV) 19.

The cyan pigment and the blue pigment are pigments that take on a cyan color and a blue color respectively, and examples thereof include a disazo-based pigment, a phthalocyanine pigment, an acidic dye lake pigment, a basic dye lake pigment, an anthraquinone-based pigment, an alkali blue pigment, and the like.

Examples of the cyan pigment and the blue pigment include C. I. Pigment Blue (hereinafter, abbreviated to PB) 1, PB15, PB15:1, PB15:2, PB15:3, PB15:4, PB15:6, PB16, PB18, PB24, PB25, PB60, PB79, and the like. Among these, a copper phthalocyanine pigment is preferable, which is preferably PB15, PB15:1, PB15:2, PB15:3, PB15:4, and PB15:6.

The green pigment is a pigment that takes on a green color, and examples thereof include a phthalocyanine pigment, a metal complex pigment, and the like.

Examples of the green pigment include C. I. Pigment Green (hereinafter, abbreviated to PG) 7, PG8, PG10, PG36, and the like.

The orange pigment is a pigment that takes on an orange color, and examples thereof include an isoindoline pigment, an anthraquinone pigment, a B-naphthol pigment, a naphthol AS pigment, an isoindolinone pigment, a perinone pigment, a disazo pigment, a quinacridone pigment, an acetron pigment, a pyrazolone pigment, and the like.

Examples of the orange pigment include C. I. Pigment Orange (hereinafter, abbreviated to PO) 2, PO3, PO4, PO5, PO13, PO15, PO16, PO22, PO24, PO34, PO36, PO38, PO43, PO48, PO49, PO51, PO55, PO60, PO61, PO62, PO64, PO66, PO72, PO74, and the like. Among these, an isoindoline pigment is preferable.

The brown pigment is a pigment that takes on a brown color, and examples thereof include naphtholone pigments such as PBr25 and PBr32.

The violet pigment is a pigment that takes on a violet color, and examples thereof include a naphtholone pigment, a perylene pigment, a naphthol AS pigment, a dioxazine pigment, and the like. Examples of pigments that can be preferably used in the present invention include C. I. Pigment Violet (hereinafter, abbreviated to PV) 13, PV17, PV23, PV29, PV32, PV37, PV50, and the like.

The black pigment is a pigment that takes on a black color, and examples thereof include an indazine pigment, a perylene pigment, and the like.

From the viewpoint of making it is easy to satisfy the Abs (NIR) ratio of 0.10 or less, examples of the black pigment include C. I. Pigment Black (hereinafter, abbreviated to PBk) 1, PBk31, PBk32, and the like.

The content of the colored colorant (for example, the colored pigment) with respect to the total amount of the color ink is preferably 1% by mass to 15% by mass, and more preferably 1.5% by mass to 10% by mass.

In a case where the content of the colored colorant (for example, the colored pigment) is 15% by mass or less, the viscosity of the color ink is reduced.

The volume average particle diameter of the colored pigment is preferably 0.01 µm to 0.8 µm, and more preferably 0.02 µm to 0.6 µm.

The volume average particle diameter is a value measured using a laser diffraction light scattering method in which tripropylene glycol methyl ether is used as a measurement solvent. As the measuring device, for example, LA-960 (manufactured by Horiba, Ltd.) is used.

The color ink may contain components (for example, a photopolymerization initiator) other than the above components.

The preferred physical properties of the components that can be contained in the color ink and the preferred physical properties of the color ink are the same as the preferred physical properties of the aforementioned components that can be contained in the IR ink and the IR ink, and preferred aspects thereof are also the same.

Therefore, regarding the preferred aspects of the component that can be contained in the color ink (for example, preferred compounds, preferred contents, and the like) and the preferred physical properties of the color ink, the description of the preferred aspects of the components that can be contained in the IR ink and the preferred physical properties of the IR ink can be appropriately referred to.

[Security Image Recording Method]

The security image recording method according to an example of the present disclosure (hereinafter, also called "recording method A") is a method of recording a security image including an infrared absorbing image and a color image having an overlap portion where the infrared absorbing image and the color image overlap each other in a plane view on a substrate by using the ink set of the present disclosure described above, the method including a step of applying the IR ink and the color ink on a substrate by an ink jet method in an arrangement in which the overlap portion where the infrared absorbing image and the color image overlap each other in a plane view is formed (hereinafter, also called "applying step"), and a step of irradiating the IR ink and the color ink applied on the substrate with an active energy ray to obtain the aforementioned security image (hereinafter, also called "irradiating step").

As necessary, the recording method A may include other steps.

In the recording method A, the security image including the infrared absorbing image and the color image is recorded using the ink set of the present disclosure described above, which makes it possible to obtain the same effect as the effect obtained by the ink set of the present disclosure described above.

<Security Image>

The security image recorded by the recording method A includes an infrared absorbing image and a color image having an overlap portion where the infrared absorbing image and the color image overlap each other in a plane view.

In the overlap portion, at least a part of the infrared absorbing image and at least a part of the color image may overlap each other. From the viewpoint of further improving the invisibility of the infrared absorbing image (that is, from the viewpoint of making it more difficult for the infrared absorbing image to be visually recognized), it is preferable that the entirety of the infrared absorbing image and at least a part of the color image overlap each other.

In the overlap portion, the color image may be disposed on the upper layer side or lower layer side of the infrared absorbing image, or may be disposed on both the upper and lower layer sides of the infrared absorbing image. Where the color image is to be disposed is determined by the order of applying the inks in the applying step.

In any case, an effect is obtained which makes it difficult for the color of the infrared absorbing image to be noticed by the color of the color image. As a result, the invisibility of the infrared absorbing image in the overlap portion is ensured. Furthermore, in any case, the phenomenon where the infrared readability deteriorates in a case where the security image is irradiated with infrared rays to read the infrared absorbing image in the security image (specifically, the phenomenon where not only the infrared absorbing image but also the color image is read) is suppressed.

From the viewpoint of infrared readability, the infrared absorbing image in the security image is preferably at least one of a text image or a code image.

The code image is preferably at least one of a dot code image, a bar code image, or a QR code (registered trademark).

The code image more preferably includes a dot code image.

Examples of the dot code image include a dot code image composed of arrays of a plurality of tiny dot patterns (circular or rectangular (for example, a square pattern)).

The color image in the security image recorded by the recording method A is not particularly limited. The color image may be an image having an area that is large enough to form the overlap portion where the color image and the infrared absorbing image overlap each other.

<Substrate>

The substrate in the recording method A is not particularly limited, and for example;

it is possible to use papers such as uncoated paper, coated paper, and thick paper used for paper containers;

a resin substrate;

a metal substrate;

a glass substrate;

and the like.

Examples of the resin substrate include resin films such as a polyethylene terephthalate (PET) film, an oriented polystyrene (OPS) film, an oriented polypropylene (OPP) film, an oriented nylon (ONy) film, a polyvinyl chloride (PVC) film, a polyethylene (PE) film, and a triacetate cellulose (TAC) film.

Examples of materials of the resin substrate include polycarbonate, an acrylic resin, ABS, polyacetal, PVA, rubbers, and the like.

Examples of the substrate also include;

a substrate with an image obtained by recording an image on the substrate exemplified above with an ink such as an aqueous ink, a solvent ink, or an ultraviolet curable-type ink;

a substrate with a coating layer obtained by coating the substrate exemplified above with an aqueous varnish, a solvent varnish, an ultraviolet curable-type varnish, or the like;

a laminated substrate obtained by laminating resins on the substrate exemplified above; and the like.

The shape of the substrate is not particularly limited, and examples thereof include a three-dimensional shape such as a bottle, a sheet shape, a film shape, and the like.

The substrate may have undergone a surface treatment.

Examples of the surface treatment include a corona treatment, a plasma treatment, a heat treatment, an abrasion treatment, a light irradiation treatment (for example, an ultraviolet irradiation treatment) and a flame treatment.

The corona treatment can be performed using, for example, CORONA MASTER (PS-10S, manufactured by Shinko Electric & Instrumentation Co., Ltd.). The conditions for the corona treatment may be appropriately selected according to the type of the substrate, the composition of the ink, and the like. The corona treatment can be performed, for example, under the following conditions.

Treatment voltage: 10 kV to 15.6 kV

Treatment speed: 30 mm/s to 100 mm/s

<Applying Step>

The applying step in the recording method A is a step of applying the IR ink and the color ink on a substrate by an ink jet method in an arrangement in which an overlap portion where the infrared absorbing image and the color image overlap each other in a plane view is formed.

Only one IR ink and only one color ink may be applied, or two or more IR inks and two or more color inks may be applied.

The order of applying each ink is applied is not particularly limited.

The overlap portion is as described in the section of <Security image>.

In the applying step, whenever each ink is applied on the substrate, the ink on the substrate may be irradiated with an active energy ray. That is, the application of each ink may be performed while the application of the ink and the irradiation with an active energy ray are being repeated.

In addition, at a point in time when a plurality of inks is applied, the plurality of inks on the substrate may be irradiated with an active energy ray.

Furthermore, in the applying step, inks may be sequentially applied without being irradiated with an active energy ray. In this case, in an irradiating step following the applying step, all the inks are cured together.

Regardless of which aspect is adopted for the applying step, in the irradiating step, the IR ink and the color ink applied on the substrate are irradiated with the active energy ray and cured, and a security image including an infrared absorbing image and a color image is recorded.

In the applying step, each ink is applied by an ink jet method.

The method of applying the ink by the ink jet method is not particularly limited, and examples thereof include known methods such as an electric charge control method of jetting an ink by using electrostatic attraction force;

a drop-on-demand method (pressure pulse method) using vibration pressure of a piezo element;

an acoustic ink jet method of converting an electric signal into an acoustic beam, irradiating an ink with the acoustic beam, and jetting the ink by using radiation pressure; and a thermal ink jet (Bubble Jet (registered trademark)) method of heating an ink to form bubbles and using the generated pressure.

As the ink applying method, for example, the method described in JP1979-59936A (JP-S54-59936A), which is a method of causing an ink to experience a rapid volume change by the action of heat energy and jetting the ink from a nozzle by using the acting force resulting from the change of state, may be used.

Regarding the ink applying method, the method described in paragraphs "0093" to "0105" of JP2003-306623A can also be referred to.

Examples of ink jet heads used for applying the ink by an ink jet method include a short serial head and a line head including an array of recording elements corresponding to the entire area of one side of a substrate.

The short serial head is used, for example, for applying an ink by a shuttle method performed in a state where the substrate is being scanned with the head in the width direction of the substrate.

The line head is used for applying an ink by a line method (also called a single-pass method) performed in a state where the substrate is being scanned in a direction intersecting with the arrangement direction of recording elements.

The line method does not require a transport system such as a carriage that transports the short serial head for scanning.

Furthermore, in the line method, complicated scanning control for moving a carriage and a substrate is not necessary, and only a substrate moves. Therefore, the recording speed can be further increased in the line method than in the shuttle method.

The amount of ink jetted from the ink jet head is preferably 1 pL (picoliter) to 100 pL, more preferably 3 pL to 80 pL, and even more preferably 3 pL to 20 pL.

As the ink jet head, a piezo-type ink jet head is preferable.

The printing resolution is preferably 320 dpi (dot per inch)×320 dpi to 4,000 dpi×4,000 dpi, more preferably 400 dpi×400 dpi to 1,600 dpi×1,600 dpi, and even more preferably 720 dpi×720 dpi to 1,600 dpi×1,600 dpi. dpi represents the number of dots per 2.54 cm (1 inch).

<Irradiating Step>

The irradiating step is a step of irradiating the IR ink and the color ink applied on the substrate with an active energy ray to obtain the aforementioned security image.

As described above, in a case where the irradiation of the ink with an active energy ray is not performed in the applying step, by the irradiation with an active energy ray in the irradiating step, the IR ink and the color ink are cured together, and a security image is obtained.

Furthermore, in a case where the irradiation of the ink with an active energy ray is performed in the applying step, by the irradiation with an active energy ray in the irradiating step, between the IR ink and the color ink, an uncured or semi-cured ink (that is, an ink which is not fully cured) is cured, and a security image is obtained.

Examples of the active energy rays include α-rays, γ rays, X-rays, ultraviolet rays, visible rays, and electron beams.

As the active energy rays, among the above, ultraviolet rays (hereinafter, also called "UV") or visible rays are preferable, and ultraviolet rays are more preferable.

The irradiation energy (that is, the exposure amount) of the active energy ray is preferably 20 mJ/cm$^2$ to 5 J/cm$^2$, and more preferably 100 mJ/cm$^2$ to 1,500 mJ/cm$^2$.

The irradiation time of the active energy ray is preferably 0.01 seconds to 120 seconds, and more preferably 0.1 seconds to 90 seconds.

As the irradiation conditions and the basic irradiation method, the irradiation conditions and the irradiation method disclosed in JP1985-132767A (JP-S60-132767A) can be adopted.

Specifically, it is preferable to use a method of providing a light source on both sides of a head unit including an ink jet device and scanning the substrate by the head unit and the light source by a so-called shuttle method, or a method of irradiating the substrate with another light source that is not involved in driving.

Examples of the light source for active energy ray irradiation include a mercury lamp, a metal halide lamp, a high-pressure mercury lamp, a medium-pressure mercury lamp, a low-pressure mercury lamp, an ultraviolet fluorescent lamp, a gas laser, a solid-state laser, a light emitting diode (LED), and a laser diode (LD), and the like.

Among these, as the light source for active energy ray irradiation, a metal halide lamp, a high-pressure mercury lamp, a medium-pressure mercury lamp, a low-pressure mercury lamp, or an ultraviolet LED (hereinafter, also called UV-LED), which is a light source for ultraviolet irradiation, is preferable.

The peak wavelength of the ultraviolet rays is, for example, preferably 200 nm to 405 nm, more preferably 220 nm to 400 nm, and even more preferably 340 nm to 400 nm.

The peak wavelength of the light (LED light) from the LED light source is preferably 200 nm to 600 nm, more preferably 300 nm to 450 nm, even more preferably 320 nm to 420 nm, and still more preferably 340 nm to 400 nm.

Examples of UV-LED include UV-LED manufactured by NICHIA CORPORATION that has a main emission spectrum having a wavelength between 365 nm and 420 nm.

Examples thereof also include UV-LED described in U.S. Pat. No. 6,084,250B that can emit a radioactive ray centered between 300 nm and 370 nm.

Furthermore, combining several UV-LEDs makes it possible to radiate ultraviolet rays in different wavelength ranges.

As the active energy ray, LED light is particularly preferable which is especially preferably LED light having a peak wavelength in a wavelength region of 340 nm to 405 nm.

For example, LED light having a peak wavelength of 355 nm, 365 nm, 385 nm, 395 nm, or 405 nm is more preferable, and LED light having a peak wavelength of 355 nm, 365 nm, 385 nm, 395 nm, or 405 nm is particularly preferable.

The maximum illuminance of LED on the substrate is preferably 10 mW/cm$^2$ to 2,000 mW/cm$^2$, more preferably 20 mW/cm$^2$ to 1,000 mW/cm$^2$, and even more preferably 50 mW/cm$^2$ to 800 mW/cm$^2$.

The irradiation of the IR ink and the color ink applied on the substrate with the active energy ray may be performed in an atmosphere at an oxygen concentration of 1% by volume or less.

In a case where the IR ink and the color ink are irradiated with the active energy ray in such an atmosphere, polymerization inhibition caused by oxygen is suppressed, and the curing properties are further improved.

The lower limit of the oxygen concentration is not particularly limited.

Performing the irradiation with the active energy ray in a vacuum or purging the atmosphere with a gas other than the air (for example, a CO$_2$ gas or an inert gas (for example, a N$_2$ gas, a He gas, a Ne gas, an Ar gas, or the like)) makes it possible to make the oxygen concentration substantially 0% by volume.

The oxygen concentration in the active energy ray-irradiating step may be 0.01% by volume to 1% by volume or 0.1% by volume to 1% by volume.

<Other Steps>

The recording method A may include other steps in addition to the applying step and the irradiating step.

Examples of those other steps include a drying step of drying the ink or the image before and after the irradiating step.

The drying means and the drying temperature in the drying step can be appropriately adjusted.

[Article with Recorded Security Image]

The article with a recorded security image according to an example of the present disclosure comprises
  a substrate, and
  a security image which is disposed on the substrate and includes an infrared absorbing image and a color image having an overlap portion where the infrared absorbing image and the color image overlap each other in a plane view,
  in which the infrared absorbing image is a cured substance of an infrared-absorbing ink jet ink,
  the infrared-absorbing ink jet ink is an infrared-absorbing ink jet ink which contains a polymerizable compound and an infrared absorbing dye and in which a maximum value of an absorbance in a wavelength range of 750 nm to 1,000 nm is greater than a maximum value of an absorbance in a wavelength range of 400 nm to 750 nm,
  the color image is a cured substance of color ink jet inks, and
  the color ink jet inks each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less.

As necessary, the article with a recorded security image according to the present example may comprise other elements in addition to the substrate and the security image.

The article with a recorded security image according to the present example can be manufactured by the recording method A described above by using the ink set of the present disclosure (specifically, the IR ink and the color ink in the ink set of the present disclosure).

Therefore, the article with a recorded security image according to the present example brings about the same effect as the effect obtained by the ink set of the present disclosure described above.

In the article with a recorded security image according to the present example, preferred aspects of the substrate and the security image are the same as the preferred aspects of the substrate and the security image in the recording method A.

For example, the infrared absorbing image in the article with a recorded security image according to the present example is preferably at least one of a text image or a code image.

EXAMPLES

Hereinafter, the present disclosure will be specifically described with reference to examples.

Hereinafter, unless otherwise specified, "parts" and "%" mean "parts by mass" and "% by mass".

Examples 1 to 15 and Comparative Examples 1 to 5

<Preparation of Infrared-Absorbing Ink Jet Ink>

As an infrared-absorbing ink jet ink (hereinafter also called "IR ink"), inks IR-1 to IR-7 were prepared as follows.

(Preparation of Ink IR-1)

The components were mixed together to obtain the following composition, and subjected to pre-dispersion for 30 minutes using a stirrer. Then, a dispersion treatment using a batch-type beads mill (trade name "EASY NANO RMB", manufactured by AIMEX CO., Ltd.) and zirconia beads having a diameter of 0.5 mmφ was performed on the mixture at 1,000 rpm (rotation speed/min) until the target particle size was obtained. The mixture was filtered using a 67 μm filter cloth, thereby obtaining a pigment dispersion liquid 1.

—Composition of Pigment Dispersion Liquid 1—

The following compound IR1 (infrared absorbing dye; squarylium compound (specifically, Specific Example S-40 described above)) . . . 1.0 g

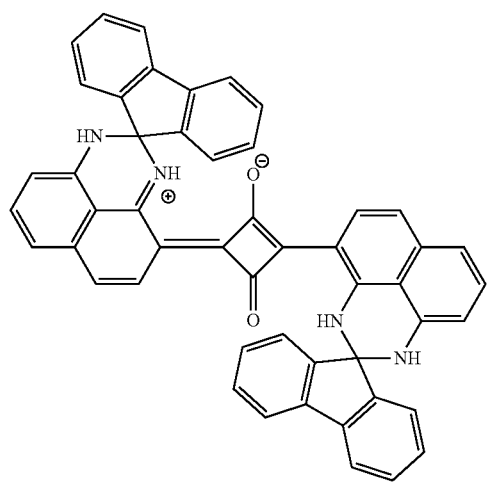

IR1

Solsperse 32000 (manufactured by Lubrizol Japan Limited.) [dispersant] . . . 0.3 g Cyclic trimethylolpropane formal acrylate (VISCOAT #200 manufactured by OSAKA ORGANIC CHEMICAL INDUSTRY LTD.; "CTFA" in Table 1) [polymerizable monomer] . . . 30.0 g Phenoxyethyl acrylate (manufactured by Tokyo Chemical Industry Co., Ltd.; "PEA" in Table 1) [polymerizable monomer] . . . 20.7 g Propoxylated neopentyl glycol diacrylate (CD9043, manufactured by Sartomer Company Inc.; "(PO) NPGDA" in Table 1) [polymerizable monomer] . . . 35.0 g Polyester acrylate (CN292, manufactured by Sartomer Company Inc.) [polymerizable oligomer] . . . 5.0 g As photopolymerization initiators, 4.0 g of Omnirad 819 (manufactured by IGM Resins B. V.) and 4.0 g of Omnirad TPO H (manufactured by IGM Resins B. V.) were added to the pigment dispersion liquid 1, followed by stirring and mixing for 30 minutes, and then the mixture was filtered using a membrane filter having an opening size of 5 μm, thereby obtaining an ink IR-1.

(Inks IR-2 to IR-7)

IR-2 to IR-7 were prepared in the same manner as in the preparation of the ink IR-1, except that the formulation of raw materials was appropriately adjusted to make the compositions shown in Table 1.

In Table 1, a numbers shown in the column of each component in each ink means a content (% by mass) with respect to the total amount of the corresponding ink. A blank means that the ink does not contain the corresponding component.

In Table 1, a compound IR2 and a compound IR3 as infrared absorbing dyes are a squarylium compound and a cyanine compound respectively, and the structures thereof are as follows. The compound IR2 is Specific Example S-41 described above.

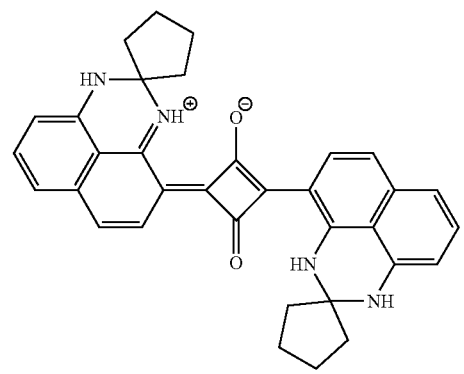

IR2

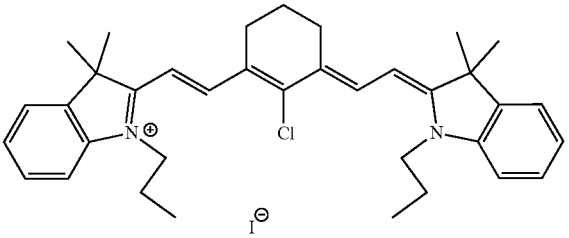

IR3

In Table 1, the abbreviations of the polymerizable monomers mean the following compounds. In Table 1, for the polymerizable monomer having a hetero ring, "having a hetero ring" is added to the abbreviation.

NVC . . . N-vinylpyrrolidone
ACMO . . . acryloylmorpholine
HDDA . . . 1,6-hexanediol diacrylate
TMPTA . . . trimethylolpropane triacrylate
DPTA . . . dipentaerythritol triacrylate (Confirmation of Absorbance Ratio [Abs (NIR)/Abs (VIS)] of Each IR Ink)

Each of the IR inks (inks IR-1 to IR-6) was diluted 2,000× with dimethyl sulfoxide, and for the obtained diluted solution, an absorbance in wavelength ranges including a wavelength range of 400 nm to 1,000 nm was measured at 25° C. by using V-570 manufactured by JASCO Corporation.

Based on the obtained results,
Abs (VIS) (that is, the maximum value of an absorbance in a wavelength range of 400 nm to 750 nm),
Abs (NIR) (that is, the maximum value of an absorbance in a wavelength range of 750 nm to 1,000 nm), and
an absorbance ratio [Abs (NIR)/Abs (VIS)] which is a ratio of Abs (NIR) to Abs (VIS) were determined.

As a result, in all of the inks IR-1 to IR-6, the absorbance ratio [Abs (NIR)/Abs (VIS)] was 5 or more.

From the above results, it has been confirmed that in the inks IR-1 to IR-6, the maximum value of the absorbance in a wavelength range of 750 nm to 1,000 nm (Abs (NIR)) is greater than the maximum value of the absorbance in a wavelength range of 400 nm to 750 nm (Abs (VIS)). That is, it has been confirmed that the inks IR-1 to IR-6 are inks having infrared absorptivity and invisibility.

<Preparation of Color Ink Jet Ink>

As a color ink jet ink (hereinafter, also called "color ink"), inks CO-1 to CO-9 were prepared in the same manner as in the preparation of the ink IR-1, except that the colored pigments shown in Table 1 were used instead of the infrared absorbing dyes and the formulation of raw materials was appropriately adjusted to make the composition shown in Table 1.

<Preparation of Ink Set>

Ink sets in which the IR ink and the color ink were combined as shown in Tables 2 and 3 were prepared.

(Ratio of Abs (NIR) of Color Ink to Abs (NIR) of IR Ink; Abs (NIR) Ratio)

Each color ink was diluted 2,000× with dimethyl sulfoxide, and for the obtained diluted solution, an absorbance in wavelength ranges including a wavelength range of 750 nm to 1,000 nm was measured at 25° C. by using V-570 manufactured by JASCO Corporation. Based on the obtained results, Abs (NIR) (that is, the maximum value of an absorbance in a wavelength range of 750 nm to 1,000 nm) was determined.

Then, for each color ink in each ink set, the following Abs (NIR) ratio was determined.

> Abs (NIR) ratio=maximum value of absorbance of color ink in wavelength range of 750 nm to 1,000 nm/maximum value of absorbance of IR ink in wavelength range of 750 nm to 1,000 nm The obtained Abs (NIR) ratios were ranked as follows.

In Tables 2 and 3, the rank of "Abs (NIR) ratio" is also added to the name of the color ink. For example, the Abs (NIR) ratio is listed as "CO-1 [A]".

In the following ranks, the ranks A and B satisfy an Abs (NIR) ratio of 0.10 or less.

—Rank of Abs (NIR) Ratio—

A: The Abs (NIR) ratio was 0.07 or less.

B: The Abs (NIR) ratio was more than 0.07 and 0.10 or less.

C: The Abs (NIR) ratio was more than 0.10 and 0.20 or less.

D: The Abs (NIR) ratio was more than 0.20.

<Security Image Recording>

The ink cartridge of an ink jet recording device (FUJIFILM DMP-2850) was filled with the IR ink and the color ink in the ink set. By using the IR ink and the color ink with which the ink cartridge was filled, a security image including an infrared absorbing image (hereinafter, also called "IR image") and a color image was recorded on coated paper as a substrate (specifically, OK TOPCOAT manufactured by Oji Paper Co., Ltd.). Details of the security image will be described later.

For recording the security image, the inks were applied in the order shown in Tables 2 and 3 (that is, the order in which the IR image and the color image were recorded).

Each of the images (the IR image and the color image) in the security image was recorded by jetting the ink from an ink jet head of the aforementioned ink jet recording device on the coated paper for each image (that is, for each ink) to apply the ink, and irradiating the applied ink with UV light (peak wavelength of 365 nm) from a UV-LED light source disposed near the ink jet head to cure the ink.

Specifically, the ink determined to be applied first was applied and irradiated with UV to record a first image, and then the ink determined to be applied second was applied and irradiated with UV to record a second image. In Examples 4 and 5, after the second image was recorded, the ink determined to be applied third was applied and irradiated with UV to record a third image. In Examples 6 and 11 in which a composite black image was recorded, after the second image was recorded, the ink determined to be applied third was applied and irradiated with UV to record a third image, and then the ink determined to be applied fourth was applied and irradiated with UV to record a fourth image.

Each ink was jetted under the conditions of 600 dpi (dots per inch) at 10 pL per dot.

In the security image, the IR image and the color image were recorded such that these images had an overlap portion where the images overlap each other in a plane view.

Specifically, in this example, as security images, a security image A and a security image B were recorded.

The color image in the security image A is a 50% half tone dot image in the form of a square that is 2 cm on one side. The IR image in the security image A is a cross-shaped image consisting of line images orthogonal to each other each having a width of 1 mm and a length of 1 cm. In the security image A, the center of the color image as a square image and the center of the IR image as a cross-shaped image overlap each other in a plane view, and the entire IR image is arranged in the region of the color image.

The color image in the security image B is a 50% half tone dot image in the form of a square that is 2 cm on one side. The IR image in the security image B is a code image consisting of 5 square images that are 0.5 mm on one side and arranged in a straight line at an interval of 2 mm. In the security image B, the center of the color image as a square image and the center of the IR image as a code image (that is, the center of the square located at the center) overlap each other in a plane view, and the entire IR image is arranged in the region of the color image.

<Evaluation of Security Image>

The following evaluations were carried out on the security images recorded as above.

The results are shown in Tables 2 and 3.

(Color of Security Image)

The color of the entire security image A was visually checked.

(Invisibility of IR Image)

The security image A was visually observed. Based on the observation results, the invisibility of the IR image (that is, the cross-shaped image) in the security image A was evaluated according to the following evaluation standard.

In the following evaluation standard, "3" is the rank that indicates the best invisibility of the IR image.

—Evaluation Standard for Invisibility of IR Image—

3: The IR image (that is, the cross-shaped image) in the security image was not visually recognized.

2: The IR image (that is, the cross-shaped image) in the security image was slightly visually recognized.

1: The IR image (that is, the cross-shaped image) in the security image was clearly visually recognized.

(IR Readability of IR Image)

The IR image (that is, a code image consisting of 5 square images arranged in a straight line) in the security image B was irradiated with infrared rays (peak wavelength 783 nm) from IR LED as a light source and read using a portable digital microscope with a color measuring function, Handy- Scope (manufactured by Spectra Co-op.) (hereinafter, this operation will be also called "IR reading"). The readability in this operation (hereinafter, also called "IR readability") was evaluated according to the following evaluation standard.

In the following evaluation standard, "4" is the rank that indicates the best IR readability of the IR image.

—Evaluation Standard for IR Readability of IR Image—
- 4: All the 5 square images in the code image could be clearly read.
- 3: Among the 5 square images in the code image, 4 square images could be clearly read.
- 2: Among the 5 square images in the code image, 3 square images could be clearly read.
- 1: Among the 5 square images in the code image, 2 or less square images could be clearly read.

(Curing Properties of Ink)

Plain paper was pressed on the security image B and then peeled off. At this time, the sticking of the plain paper and the color transfer to the plain paper were checked, and based on the checked results, the curing properties of the ink was evaluated according to the following evaluation standard.

—Evaluation Standard for Curing Properties of Ink—
- 3: Sticking and color transfer did not occur.
- 2: Although slight sticking occurred, color transfer did not occur.
- 1: At least one of marked sticking or color transfer occurred.

(IR Readability after Rub)

The surface of the security image B was rubbed back and forth 5 times with a cotton swab, and the IR readability of the security image B after rub was evaluated according to the same evaluation standard as the evaluation standard for the IR readability of the IR image described above.

TABLE 1

| Type of ink | | IR ink | | | | | | | Color ink | |
|---|---|---|---|---|---|---|---|---|---|---|
| Ink No. | | IR-1 | IR-2 | IR-3 | IR-4 | IR-5 | IR-6 | IR-7 | CO-1 | CO-2 |
| IR dye | IR1 (squarylium) | 1.0 | | | 1.0 | 1.0 | 1.0 | 1.0 | | |
| | IR2 (squarylium) | | 2.0 | | | | | | | |
| | IR3 (cyanine) | | | 1.0 | | | | | | |
| Colored colorant | Pigment Yellow 155 | | | | | | | | 2.0 | |
| | Pigment Red 122 | | | | | | | | | 4.0 |
| | Pigment Blue 15:3 | | | | | | | | | |
| | Pigment Black 7 (Carbon black) | | | | | | | | | |
| Dispersant | Solsperse 32000 | 0.3 | 0.3 | 0.3 | 0.4 | 0.4 | 0.4 | 0.3 | 0.6 | 1.2 |
| Polymerization initiator | Omnirad 819 | 4.0 | 4.0 | 4.0 | 4.0 | 4.0 | 4.0 | 4.0 | 4.0 | 4.0 |
| | Omnirad TPO H | 4.0 | 4.0 | 4.0 | 4.0 | 4.0 | 4.0 | 4.0 | 5.0 | 8.0 |
| Polymerizable monomer | NVC (having hetero ring) | | 20.0 | | 16.0 | | | | 10.0 | 20.0 |
| | CTFA (having hetero ring) | 30.0 | | 30.0 | | | | 30.0 | 20.0 | |
| | ACMO (having hetero ring) | | 5.0 | | 19.6 | | | | | |
| | PEA | 20.7 | 24.7 | 20.7 | | 35.6 | 40.6 | 30.7 | 23.4 | 32.8 |
| | (PO)NPGDA | 35.0 | 35.0 | 35.0 | 30.0 | 30.0 | 50.0 | 25.0 | 30.0 | 30.0 |
| | HDDA | | | | 20.0 | 20.0 | | | | |
| | TMPTA | | | | | | | | | |
| | DPTA | | | | 5.0 | 5.0 | | | | |
| Polymerizable oligomer | CN292 | 5.0 | 5.0 | 5.0 | | | | 5.0 | 5.0 | |
| Content of monomer having 2 or more functional groups (% by mass) | | 35.0 | 35.0 | 35.0 | 55.0 | 55.0 | 50.0 | 25.0 | 30.0 | 30.0 |

| Type of ink | | Color ink | | | | | | |
|---|---|---|---|---|---|---|---|---|
| Ink No. | | CO-3 | CO-4 | CO-5 | CO-6 | CO-7 | CO-8 | CO-9 |
| IR dye | IR1 (squarylium) | | | | | | | |
| | IR2 (squarylium) | | | | | | | |
| | IR3 (cyanine) | | | | | | | |
| Colored colorant | Pigment Yellow 155 | | 2.0 | 2.0 | 2.0 | | | |
| | Pigment Red 122 | | | | | | | |
| | Pigment Blue 15:3 | 1.5 | | | | | | 6.0 |
| | Pigment Black 7 (Carbon black) | | | | | 2.0 | 2.0 | |
| Dispersant | Solsperse 32000 | 0.6 | 0.6 | 0.6 | 0.6 | 0.6 | 0.6 | 1.8 |
| Polymerization initiator | Omnirad 819 | 4.0 | 4.0 | 4.0 | 4.0 | 4.0 | 4.0 | 4.0 |
| | Omnirad TPO H | 4.0 | 4.0 | 4.0 | 4.0 | 4.0 | 4.0 | 4.0 |
| Polymerizable monomer | NVC (having hetero ring) | 20.0 | | | 20.0 | 10.0 | | |
| | CTFA (having hetero ring) | | | | | 20.0 | | |
| | ACMO (having hetero ring) | | | | | 19.4 | | |
| | PEA | 35.9 | 39.4 | 44.4 | | 29.4 | 49.4 | 32.2 |
| | (PO)NPGDA | 30.0 | 25.0 | 45.0 | 25.0 | | 30.0 | 40.0 | 50.0 |
| | HDDA | | 20.0 | | 20.0 | | | |
| | TMPTA | | | | | | | |
| | DPTA | | | 5.0 | | 5.0 | | |

TABLE 1-continued

| | | | | | | | | |
|---|---|---|---|---|---|---|---|---|
| Polymerizable oligomer | CN292 | | 4.0 | | | | | 2.0 |
| Content of monomer having 2 or more functional groups (% by mass) | | | 30.0 | 50.0 | 45.0 | 50.0 | 30.0 | 40.0 | 50.0 |

TABLE 2

| | | | Example 1 | Example 2 | Example 3 | Example 4 | Example 5 | Example 6 | Example 7 | Example 8 |
|---|---|---|---|---|---|---|---|---|---|---|
| Ink set | | IR ink No. | IR-1 | IR-2 | IR-2 | IR-1 | IR-1 | IR-1 | IR-5 | IR-6 |
| | | Color ink No. [Rank of Abs (NIR) ratio] | CO-1 [A] | CO-2 [A] | CO-3 [B] | CO-2 [A] CO-3 [B] | CO-2 [A] CO-3 [B] | CO-1 [A] CO-2 [A] CO-3 [B] | CO-4 [A] | CO-5 [A] |
| Order of application | First | | IR-1 | IR-2 | IR-2 | CO-3 | CO-2 | CO-1 | IR-5 | IR-6 |
| | Second | | CO-1 | CO-2 | CO-3 | IR-1 | CO-3 | CO-3 | CO-4 | CO-5 |
| | Third | | | | | CO-2 | IR-1 | CO-2 | | |
| | Fourth | | | | | | | IR-1 | | |
| Evaluation result | Color of security image | | Yellow | Magenta | Cyan | Blue | Blue | Black | Yellow | Yellow |
| | Invisibility of IR image | | 3 | 3 | 3 | 3 | 3 | 3 | 3 | 3 |
| | IR readability of IR image | | 4 | 4 | 4 | 4 | 4 | 4 | 4 | 4 |
| | Curing properties | | 3 | 3 | 3 | 3 | 3 | 3 | 2 | 2 |
| | IR readability after rub | | 4 | 4 | 3 | 4 | 4 | 4 | 3 | 3 |

| | | | Example 9 | Example 10 | Example 11 | Example 12 | Example 13 | Example 14 | Example 15 |
|---|---|---|---|---|---|---|---|---|---|
| | Ink set | IR ink No. | IR-3 | IR-1 | IR-4 | IR-5 | IR-6 | IR-4 | IR-7 |
| | | Color ink No. [Rank of Abs (NIR) ratio] | CO-1 [A] | CO-3 [B] | CO-1 [A] CO-2 [A] CO-3 [B] | CO-4 [A] | CO-5 [A] | CO-6 [A] | CO-1 [A] |
| | Order of application | First | IR-3 | IR-1 | IR-4 | CO-4 | CO-5 | IR-4 | IR-7 |
| | | Second | CO-1 | CO-3 | CO-3 | IR-5 | IR-6 | CO-6 | CO-1 |
| | | Third | | | CO-2 | | | | |
| | | Fourth | | | CO-1 | | | | |
| | Evaluation result | Color of security image | Yellow | Cyan | Black | Yellow | Yellow | Yellow | Yellow |
| | | Invisibility of IR image | 3 | 3 | 3 | 3 | 3 | 3 | 3 |
| | | IR readability of IR image | 3 | 4 | 4 | 4 | 4 | 4 | 4 |
| | | Curing properties | 3 | 2 | 3 | 2 | 2 | 3 | 2 |
| | | IR readability after rub | 3 | 2 | 4 | 2 | 2 | 4 | 3 |

TABLE 3

| | | Comparative example 1 | Comparative example 2 | Comparative example 3 | Comparative example 4 | Comparative example 5 |
|---|---|---|---|---|---|---|
| Ink set | IR ink No. | | IR-1 | IR-2 | IR-4 | IR-1 |
| | Color ink No. | CO-1 | CO-7 | CO-8 | | CO-9 |
| | [Rank of Abs (NIR) ratio] | [A] | [D] | [D] | | [C] |
| Order of application | First | CO-1 | IR-1 | IR-2 | IR-4 | IR-1 |
| | Second | | CO-7 | CO-8 | | CO-9 |
| | Third | | | | | |
| | Fourth | | | | | |
| Evaluation result | Color of security image | Yellow | Black | Black | — | Cyan |
| | Invisibility of IR image | — | 3 | 3 | 1 | 3 |
| | IR readability of IR image | — | 1 | 1 | 4 | 1 |
| | Curing properties | 3 | 3 | 2 | 3 | 2 |
| | IR readability after rub | — | 1 | 1 | 4 | 1 |

As shown in Tables 1 to 3, in Examples 1 to 15 in which a security image including an IR image and a color image was recorded using an ink set comprising an IR ink that contained a polymerizable compound and an IR colorant and a color ink that contained a polymerizable compound and a colored colorant and satisfied the following Abs (NIR) ratio of 0.10 or less, the IR image in the security image was excellent in IR readability and invisibility.

Abs (NIR) Ratio=maximum value of absorbance of color ink in wavelength range of 750 nm to 1,000 nm/maximum value of absorbance of IR ink in wavelength range of 750 nm to 1,000 nm In Comparative Example 1 in which the IR ink was not used unlike examples, an IR image could not be recorded.

Furthermore, in Comparative Examples 2, 3, and 5 in which the Abs (NIR) ratio was more than 0.10, the IR readability of the IR image deteriorated. As the reason, it is considered that because the color image had excessively high infrared absorptivity, not only the IR image but also the color image might be read in a case where the IR image in the security image B was read using IR, and accurate IR reading could not be performed.

In Comparative Example 4 in which a color ink was not used, a color image could not be recorded. As a result, the IR image could not be hidden by the color image, which deteriorated the invisibility of the IR image.

The results of Examples 1, 2, and 9 tell that in a case where the infrared absorbing dye in the IR ink includes a squarylium dye (see Examples 1 and 2), the IR readability of the IR image is further improved.

The results of Examples 12 and 14 tell that in a case where at least one of the polymerizable compound contained in the IR ink or the polymerizable compound contained in the color ink includes a vinyl monomer having a hetero ring group (see Example 14), the IR readability after rub is further improved.

The results of Examples 14 and 15 tell that in a case where the mass-based content of the radically polymerizable monomer having 2 or more functional groups in the IR ink is higher than the mass-based content of the radically polymerizable monomer having 2 or more functional groups in the color ink (see Example 14), the IR readability after rub is further improved.

The entire disclosure of Japanese Patent Application No. 2020-121262, filed Jul. 15, 2020 is incorporated into the present specification by reference. All of documents, patent applications, and technical standards described in the present specification are incorporated into the present specification by reference to approximately the same extent as a case where it is specifically and respectively described that the respective documents, patent applications, and technical standards are incorporated by reference.

What is claimed is:

1. An ink set for security image recording comprising:
    an infrared-absorbing ink jet ink which contains a polymerizable compound and an infrared absorbing dye and in which a maximum value of an absorbance in a wavelength range of 750 nm to 1,000 nm is larger than a maximum value of an absorbance in a wavelength range of 400 nm to 750 nm; and
    color ink jet inks which each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less,
    wherein the polymerizable compound contained in the infrared-absorbing ink jet ink includes at least one vinyl monomer having a hetero ring.

2. The ink set for security image recording according to claim 1,
    wherein the number of the color ink jet inks is 3 or more, and
    the 3 or more color ink jet inks include a color ink jet ink Y containing a yellow colorant as the colored colorant, a color ink jet ink M containing at least one colorant selected from the group consisting of a magenta colorant, a red colorant, a violet colorant, and a pink colorant as the colored colorant, and a color ink jet ink C containing at least one colorant selected from the group consisting of a cyan colorant and a blue colorant as the colored colorant.

3. The ink set for security image recording according to claim 1,
    wherein the colored colorant contained in each of the color ink jet inks is at least one colorant selected from the group consisting of an organic dye and an organic pigment.

4. The ink set for security image recording according to claim 1,
wherein the infrared absorbing dye includes a squarylium dye.

5. The ink set according to claim 4,
wherein the squarylium dye is a squarylium compound represented by Formula (1),

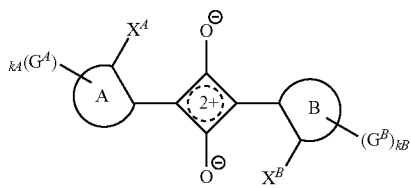
(1)

in Formula (1), a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, kB represents an integer of 0 to nB, nA represents an integer which is a maximum number of $G^A$'s capable of substituting the ring A, nB represents an integer which is a maximum number of $G^B$'s capable of substituting the ring B, $X^A$ and $G^A$ or $X^B$ and $G^B$ may be bonded to each other to form a ring, and in a case where there is a plurality of $G^A$'s and a plurality of $G^B$'s, the plurality of $G^A$'s bonded to the ring A may be bonded to each other to form a ring and the plurality of $G^B$'s bonded to the ring B may be bonded to each other to form a ring.

6. The ink set for security image recording according to claim 1,
wherein the polymerizable compound contained in each of the color ink jet inks includes a vinyl monomer having a hetero ring.

7. The ink set for security image recording according to claim 1,
wherein the infrared-absorbing ink jet ink contains at least one of a monofunctional radically polymerizable monomer or a bifunctional radically polymerizable monomer,
a total content of the monofunctional radically polymerizable monomer and the bifunctional radically polymerizable monomer contained in the infrared-absorbing ink jet ink is 50% by mass or more with respect to a total amount of the infrared-absorbing ink jet ink,
each of the color ink jet inks contains at least one of a monofunctional radically polymerizable monomer or a bifunctional radically polymerizable monomer, and
a total content of the monofunctional radically polymerizable monomer and the bifunctional radically polymerizable monomer is 50% by mass or more with respect to a total amount of each of the color ink jet inks.

8. The ink set for security image recording according to claim 1,
wherein a mass-based content of a radically polymerizable monomer having 2 or more functional groups in the infrared-absorbing ink jet ink is higher than a mass-based content of a radically polymerizable monomer having 2 or more functional groups in each of the color ink jet inks.

9. A security image recording method which is a method of recording a security image on a substrate by using the ink set for security image recording according to claim 1, the security image including an infrared absorbing image and a color image having an overlap portion where the infrared absorbing image and the color image overlap each other in a plane view, the method comprising:
a step of applying the infrared-absorbing ink jet ink and the color ink jet inks on a substrate by an ink jet method, in an arrangement in which the overlap portion where the infrared absorbing image and the color image overlap each other in a plane view is formed; and
a step of irradiating the infrared-absorbing ink jet ink and the color ink jet inks applied on the substrate with an active energy ray to obtain the security image.

10. The security image recording method according to claim 9,
wherein the infrared absorbing image is at least one of a text image or a code image.

11. An article with a recorded security image comprising:
a substrate, and
a security image which is disposed on the substrate and includes an infrared absorbing image and a color image having an overlap portion where the infrared absorbing image and the color image overlap each other in a plane view,
wherein the infrared absorbing image is a cured substance of an infrared-absorbing ink jet ink,
the infrared-absorbing ink jet ink is an infrared-absorbing ink jet ink which contains a polymerizable compound and an infrared absorbing dye and in which a maximum value of an absorbance in a wavelength range of 750 nm to 1,000 nm is greater than a maximum value of an absorbance in a wavelength range of 400 nm to 750 nm,
the color image is a cured substance of color ink jet inks, and
the color ink jet inks each contain a polymerizable compound and a colored colorant and satisfy a ratio of a maximum value of an absorbance of each of the color ink jet inks in a wavelength range of 750 nm to 1,000 nm to the maximum value of the absorbance of the infrared-absorbing ink jet ink in a wavelength range of 750 nm to 1,000 nm of 0.10 or less.

12. The article with a recorded security image according to claim 11,
wherein the infrared absorbing image is at least one of a text image or a code image.

* * * * *